US008315569B2

(12) United States Patent
Harada et al.

(10) Patent No.: US 8,315,569 B2
(45) Date of Patent: Nov. 20, 2012

(54) CONTROLLER AND METHOD FOR USE IN RADIO STATION IN RADIO COMMUNICATION SYSTEM

(75) Inventors: Hiroki Harada, Yokosuka (JP); Koji Maeda, Yokohama (JP); Tomoyuki Ohya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 275 days.

(21) Appl. No.: 12/720,229

(22) Filed: Mar. 9, 2010

(65) Prior Publication Data
US 2010/0233963 A1 Sep. 16, 2010

(30) Foreign Application Priority Data
Mar. 12, 2009 (JP) .................. 2009-060237

(51) Int. Cl.
*H04B 15/00* (2006.01)
(52) U.S. Cl. ...... 455/62; 455/63.1; 455/63.3; 455/67.13
(58) Field of Classification Search .......... 455/62, 455/63.3, 67.11, 561; 370/330, 329, 252, 370/311; 375/260, 219, 295, 296
See application file for complete search history.

(56) References Cited

U.S. PATENT DOCUMENTS

| | | | |
|---|---|---|---|
| 2003/0202614 A1* | 10/2003 | Braithwaite | 375/296 |
| 2006/0171326 A1* | 8/2006 | Durand et al. | 370/252 |
| 2006/0209746 A1 | 9/2006 | Asai et al. | |
| 2008/0008231 A1* | 1/2008 | Wang et al. | 375/219 |
| 2008/0026704 A1 | 1/2008 | Maeda et al. | |
| 2008/0090581 A1 | 4/2008 | Hu | |
| 2008/0233946 A1 | 9/2008 | Henry | |
| 2008/0268859 A1 | 10/2008 | Lee et al. | |
| 2008/0316950 A1* | 12/2008 | Damnjanovic | 370/311 |
| 2009/0061938 A1* | 3/2009 | Ulbricht et al. | 455/561 |
| 2009/0225720 A1* | 9/2009 | Molisch et al. | 370/330 |
| 2010/0113059 A1 | 5/2010 | Morimoto et al. | |

FOREIGN PATENT DOCUMENTS

| | | |
|---|---|---|
| CN | 1167416 | 12/1997 |
| JP | 2006-222665 | 8/2006 |
| JP | 2007-129422 | 5/2007 |
| JP | 2007-258844 | 10/2007 |

(Continued)

OTHER PUBLICATIONS

TSG-RAN WG1 Meeting #44, R1-060670, Denver, USA, "Interference Mitigation by Partial Frequency Reuse", Feb. 13-17, 2006, pp. 1-5.

(Continued)

*Primary Examiner* — Lana N Le
*Assistant Examiner* — Golam Sorowar
(74) *Attorney, Agent, or Firm* — Oblon, Spivak, McClelland, Maier & Neustadt, L.L.P.

(57) ABSTRACT

One aspect of the present invention relates to a controller for a radio station. The controller includes an information acquisition unit acquiring radio communication state information on another radio station different from the radio station via a connected backbone network, the radio communication state information including frequency information and waveform feature information, a waveform information extraction unit calculating a waveform feature based on the waveform feature information, the waveform feature indicating whether a received radio signal includes the radio signal transmitted from the other radio station, and a radio resource parameter determination unit determining whether signal transmission from the radio station is available and specify a radio resource to be used for the signal transmission based on the frequency information, the waveform feature information and/or the calculated waveform feature.

18 Claims, 22 Drawing Sheets

FOREIGN PATENT DOCUMENTS

| | | |
|---|---|---|
| JP | 2008-61214 | 3/2008 |
| JP | 2008-278273 | 11/2008 |
| WO | WO 2005/086516 | 9/2005 |
| WO | WO 2007/053195 A1 | 5/2007 |
| WO | WO 2007/108449 A1 | 9/2007 |

OTHER PUBLICATIONS

ANSI/IEEE Std 802.11, "Wireless LAN Medium Access Control (MAC) and Physical Layer (PHY) Specifications", Local and Metropolitan Area Networks: Wireless LAN, Aug. 20, 1999, pp. 70-97.

Hiroyoshi Matsuda, et al., "Voice Activity Detection with 3rd Order Cumulant", The Institute of Electronics, Information and Communication Engineers, IEICE (Japan), Technical Report of IEICE, vol. 106, No. 263 (Sep. 19, 2006), pp. 1-6, with English Abstract and English Translation.

IEEE 802.2 Working Group of the LAN MAN Standards Committee, "IEEE P802.22™/D0.2, Draft Standard for Wireless Regional Area Networks Part 22: Cognitive Wireless RAN Medium Access Control (MAC) and Physical Layer (PHY) specifications: Policies and procedures for operation in the TV Bands", The Institute of Electrical and Electronics Engineers, Nov. 2006, pp. 1-306 with 6 additional pages.

Office Action issued Jul. 2, 2012, in Chinese Patent Application No. 201010135793X (with Enlgish-language Translation), 12 pages.

Office Action mailed Jun. 26, 2012 in Japanese Patent Application No. 2009-060237 filed Mar. 12, 2009 with English translation.

* cited by examiner

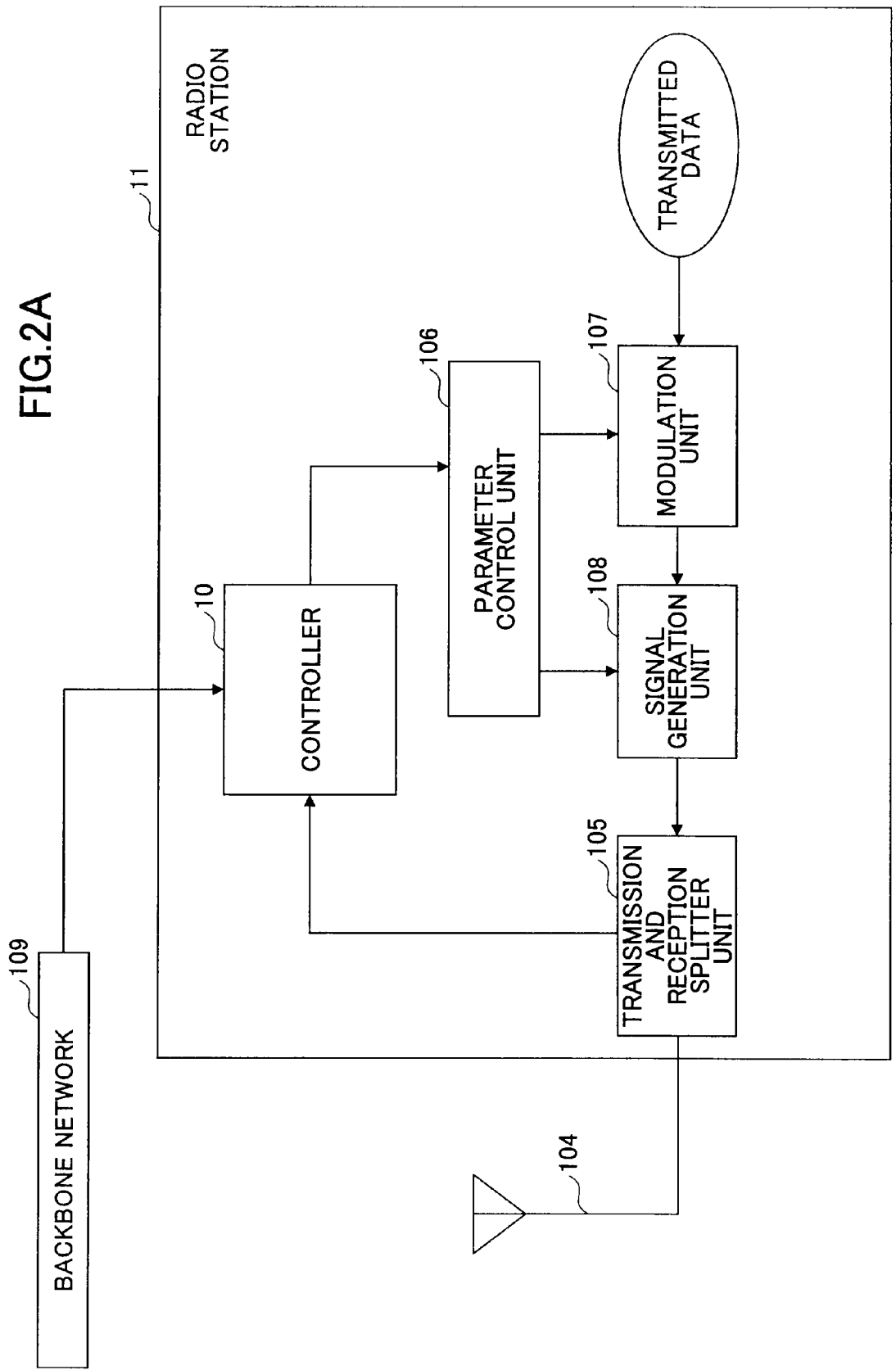

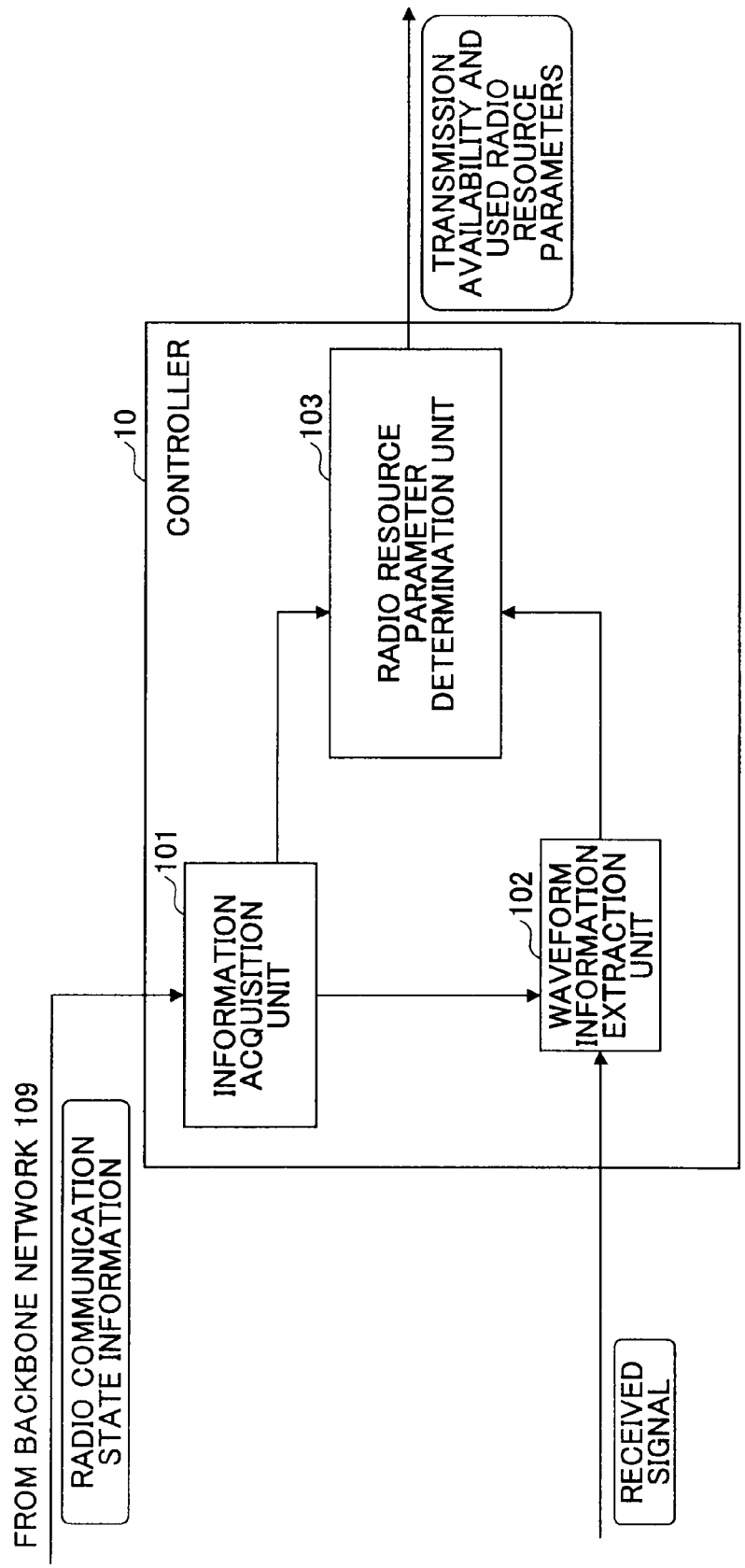

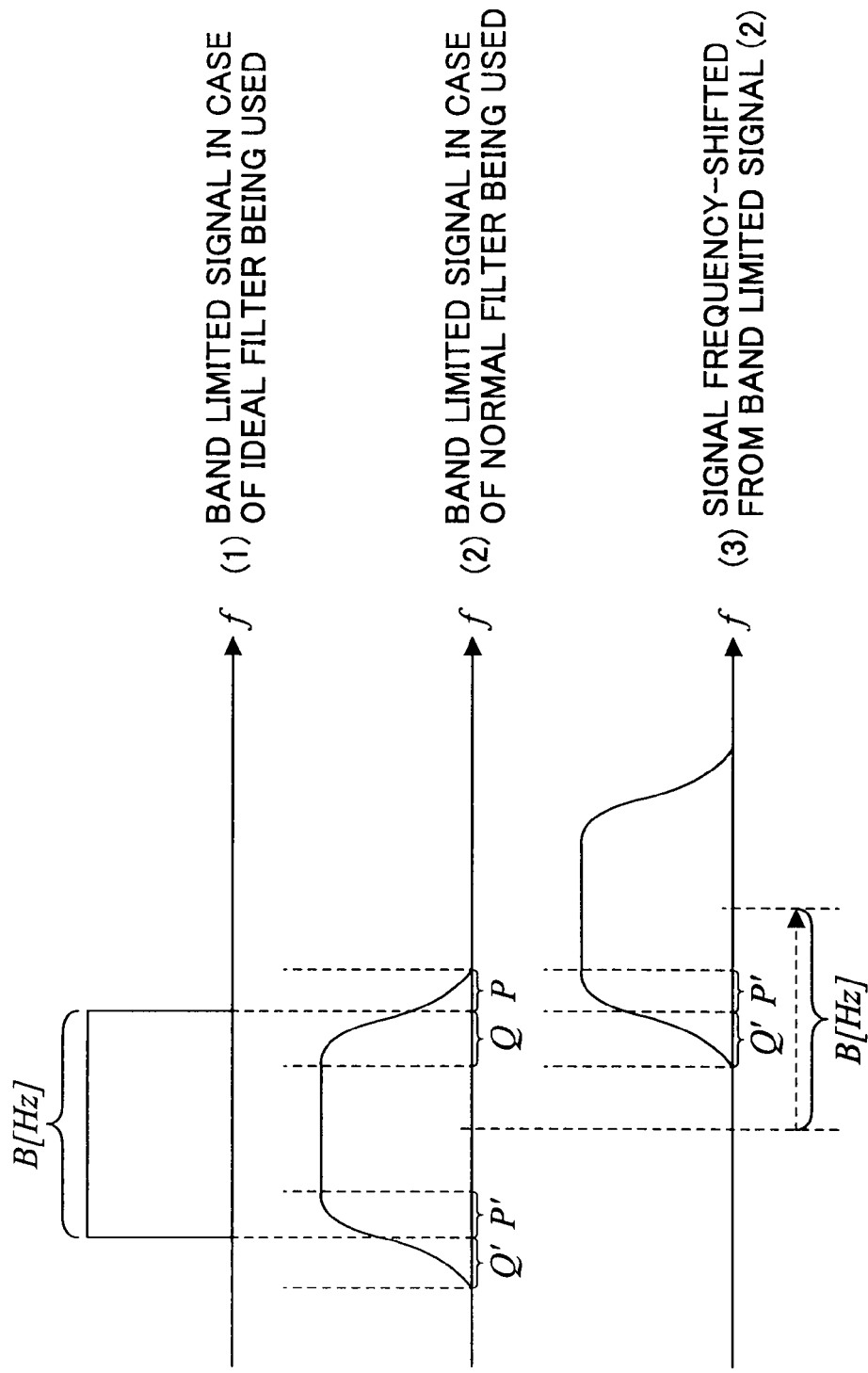

FIG.3

| TIME | FREQUENCY BAND | FEATURE | RADIO STATION |
|---|---|---|---|
| T1~T2 | f1~f2 | c1 | a |
| T1~T3 | f3~f4 | c2 | b |
| T2~T3 | f1~f3 | c3 | c |
| ... | ... | ... | ... |

CONTROLLER AND METHOD FOR USE IN RADIO STATION IN RADIO COMMUNICATION SYSTEM

BACKGROUND OF THE INVENTION

1. Field of the Invention

The present invention relates to a controller and a control method for use in a radio station in the environment where several radio stations share a common frequency band.

2. Description of the Related Art

In current radio communications, different dedicated frequency bands are often assigned to radio communication systems in order to avoid mutual interference between the radio communication systems. For more efficient utilization of limited frequency resources, however, it has been recently discussed that several radio communication systems use a common frequency band. In order to share such a common frequency band, multiple radio stations or multiple radio communication systems must comprehend frequency usage states each other and control transmissions to avoid occurrence of interference. Basically, there are two approaches for the transmission control. One of the approaches relates to distributed control where individual radio stations monitor frequency usage states around themselves and autonomously determine availability of transmissions. The other approach relates to centralized control where a control station provided for uniformly managing frequency usage states of the radio stations determines availability of respective transmissions by the radio stations.

In one conventional technique, a common frequency band is efficiently reused over different cells in a radio communication system. In normal cellular systems, one scheme referred to as "inter-cell frequency reuse" may be utilized. In the inter-cell frequency reuse scheme, different frequency bands are used in adjacent cells to avoid inter-cell interference. A document "3GPP.R1-060670" proposes an interference coordination scheme where frequency bands to be assigned for radio stations residing in cell boundaries are predetermined such that the frequency bands for use in the cell boundaries can be assigned for adjacent cells differently from each other for avoidance of the inter-cell interference. Also, Japan Laid-Open Patent Publication No. 2007-258844 proposes one technique for reducing influence of interference on the radio stations residing in cell boundaries by grouping the radio stations based on CQI (Channel Quality Indicator) information reported from the radio stations and assigning resource blocks corresponding to different transmission power levels for the radio station groups. In addition, Japan Laid-Open Patent Publication No. 2007-258844 proposes another technique for preventing occurrence of the interference due to usage of a common resource block around cell boundaries by causing base stations to measure interference power caused from adjacent cells and adjusting power allocated to the common resource block for cells having significant interference.

Furthermore, Japan Laid-Open Patent Publication No. 2008-278273 discloses that assignment of interference area resources, that is, resources where interference may be likely to arise, is inhibited based on resource assignment information shared among radio stations in a radio communication system. The disclosed scheme may relate to the above-mentioned centralized control approach. Frequency usage state information is shared among the neighboring radio stations beforehand, and a control station assigns resources for the individual radio stations based on collected information pieces to avoid occurrence of interference.

On the other hand, a CSMA/CA (Carrier Sense Multiple Access with Collision Avoidance) scheme is known as one technique for utilizing a common frequency band under distributed control. The CSMA/CA are described in detail in a document "Part 11: Wireless LAN Medium Access Control (MAC) and Physical Layer (PHY) specifications, ANSI/IEEE Std 802.11, 1999 Edition", for example. In the CSMA/CA scheme for use in wireless LAN systems typically complying with the IEEE 802.11 standard, reception level is measured prior to data transmissions in order to determine availability of the data transmissions. If the CSMA/CA scheme is utilized in environments where different radio communication systems share a common frequency band, individual radio stations determine availability of transmissions based on respective radio communication environment information pieces separately collected by the radio stations. Thus, even if the collected radio communication environment information pieces are not shared among the radio communication systems, interference can be avoided by the individual radio stations activating the transmissions only upon failure of signal detection.

Also, Japan Laid-Open Patent Publication No. 2006-222665 discloses some technique for avoiding interference by radio stations detecting the presence of signals through calculation of features for signal cyclostationarity and activating transmissions only without detection of the signals. According to this technique, even when different radio communication systems use a common frequency band, the radio stations can detect the presence of signals being used around themselves and fulfill transmissions if it is determined that no interference may arise.

In the case where different radio communication systems share a common frequency band, there is a likelihood that information may not be necessarily exchanged between radio stations. Under the centralized control over radio resources, if the information cannot be appropriately transmitted, there is a risk that signal quality may be significantly degraded. Specifically, according to the conventional scheme as disclosed in 3GPP. R1-060670, although a common frequency band is shared among user apparatuses distinguished from each other by means of spread codes, radio stations belonging to different radio communication systems cannot always use the spread codes or other information, which means that they may not be able to successfully avoid occurrence of interference. Also, according to the conventional interference reduction scheme through interference coordination of radio stations residing in cell boundaries, there is a likelihood that precise cell design may be impossible for some supposed frequency sharing environments, which may cause some areas having significant degradation of characteristics due to interference. Furthermore, according to the conventional scheme as disclosed in Japan Laid-Open Patent Publication No. 2007-258844, base stations group mobile stations based on CQI information reported from the mobile stations and assign resources for individual groups. Since radio stations in different radio communication systems cannot share the CQI information through exchanges of radio signals, it may be difficult to fulfill the grouping and appropriate resource assignment. Also in the scheme as disclosed in Japan Laid-Open Patent Publication No. 2008-278273, resource assignment information cannot be similarly shared in the suggested environments, resulting in significant characteristics degradation. As stated above, the centralized control scheme can only be implemented with high complexity in that a larger amount of information is required. In addition, the centralized control scheme may degrade the characteristics significantly under some environments where it is difficult to share information among different radio communication systems, for example, under the environment where a common frequency band is shared among the different radio communication systems.

In contrast, in the distributed control using the conventional CSMA/CA scheme or the scheme as proposed in Japan Laid-Open Patent Publication No. 2006-222665, radio stations cannot always make appropriate determination on transmission availability. For example, although communications are ongoing near a certain radio station and accordingly that radio station should defer transmissions, the radio station may determine that some radio resources are available from some reasons by itself and use these radio resources, resulting in occurrence of interference. On the other hand, although no neighboring radio station uses a radio resource, a radio station may determine that that radio resource is being used due to erroneous detection and defer transmissions. In this case, interference may not arise, but frequency utilization efficiency may be reduced. As stated above, according to the distributed control scheme, interference can be avoided even in situations where information is insufficiently shared compared to the centralized control and can be implemented with low complexity. However, the distributed control scheme could achieve less beneficial interference avoidance effect and/or lower frequency utilization efficiency than the centralized control scheme.

SUMMARY OF THE INVENTION

The present invention addresses some disadvantages of the centralized control scheme and the distributed control scheme as stated above. One object of the present invention is to provide a controller and a control method for efficiently utilizing frequency resources while reducing influence of interference not only among radio stations using a common radio communication system but also on adjacent radio stations.

In order to overcome the above-mentioned problems, one aspect of the present invention relates to a controller for controlling transmission availability for a radio station in a radio communication system, including: an information acquisition unit configured to acquire radio communication state information on another radio station different from the radio station via a backbone network connected to the radio station and the other radio station, the radio communication state information including frequency information indicative of a frequency band used by the other radio station and waveform feature information indicative of a waveform feature of a radio signal transmitted from the other radio station; a waveform information extraction unit configured to receive a radio signal and calculate a waveform feature based on the waveform feature information, the waveform feature indicating whether the received radio signal includes the radio signal transmitted from the other radio station; and a radio resource parameter determination unit configured to determine whether signal transmission from the radio station is available and specify a radio resource to be used for the signal transmission based on the frequency information, the waveform feature information and/or the calculated waveform feature. Particularly, radio stations can communicate with each other without causing interference to other radio stations under frequency shared environments where common frequency bands are shared among the radio stations.

In one embodiment, the controller may further include a signal demodulation unit configured to receive and demodulate a radio signal to generate a demodulated data symbol sequence, and a reliability determination unit configured to determine reliability of the demodulated data symbol sequence, wherein the radio resource parameter determination unit is configured to determine whether signal transmission from the radio station is available and specify a radio resource to be used for the signal transmission based on the frequency information, the waveform feature information, the calculated waveform feature, the demodulated data symbol sequence and/or the reliability.

The present controller is connected to a backbone network and can acquire radio communication state information regarding neighboring radio stations from the backbone network. Accordingly, the controller can determine the presence and magnitude of signals transmitted from radio stations using different radio communication systems based on calculated waveform features.

In addition, the present controller may use the radio resource parameter determination unit to disable transmission if the waveform feature derived by the waveform information extraction unit exceeds a predefined threshold. Accordingly, it is possible to reduce interference that may influence neighboring radio stations.

In addition, the radio resource parameter determination unit may include a quality estimation table including correspondence between a peak amount of a waveform feature and signal quality of a channel between the radio station and the other radio station. The present controller may use the radio resource parameter determination unit to estimate channel quality between the present radio station and a neighboring radio station based on the magnitude of a peak of the derived waveform feature. Based on the estimation, the radio resource parameter determination unit may determine whether signal transmission from the radio station is available and specify a radio resource to be used for the signal transmission in the radio communication system. Accordingly, it is possible to make effective use of radio resources under reduced interference influencing neighboring radio systems.

The present controller includes a reliability determination unit configured to determine reliability of the demodulated data symbol sequence. Based on the reliability, it may be determined whether the demodulated data symbol sequence generated by the signal demodulation unit can be used to specify radio resource parameters.

If the reliability of the demodulated data symbol sequence is lower than or equal to a threshold, the radio resource parameter determination unit may discard the demodulated data symbol sequence and determine availability of data transmissions and radio resource parameters in the radio communication system based on only frequency band usage state information, the feature information and the calculated waveform feature. Accordingly, it is possible to detect signals transmitted from neighboring radio stations even in poor communication environments where the signals cannot be demodulated, for example, and make effective use of radio resources under reduced interference.

The radio resource parameter determination unit may include an interference estimation unit configured to estimate an interference level that may influence neighboring radio stations based on information derived from the demodulated data symbol sequence. If the reliability of the demodulated data symbol sequence is higher than or equal to a threshold, the radio resource parameter determination unit may determine availability of data transmission and radio resource parameters in the radio communication system based on the estimated interference level. Accordingly, in the case where signals transmitted from the neighboring radio stations can be demodulated, it is possible to use information derived from the demodulated signals with priority to make effective use of radio resources under reduced interference.

The present controller may further include a bandpass filter unit configured to pass only a certain band component of incoming signals and filter out the other band components. The controller receives signals from neighboring radio stations and performs band-limiting on the received signals based on frequency band usage state information, resulting in more accurate signal detection.

The bandpass filter unit may apply a pass band corresponding to a frequency band assigned to a signal determined to use a portion or the whole of a desired transmission band based on the frequency band usage state information. The bandpass filter unit may receive signals from neighboring radio stations and perform band-limiting on the received signals based on the pass band.

The bandpass filter unit may receive signals from neighboring radio stations and perform band-limiting on the received signals based on a desired transmission band.

Another aspect of the present invention relates to a method of controlling transmission availability for a radio station in a radio communication system, including: acquiring radio communication state information on another radio station different from the radio station via a backbone network connected to the radio station and the other radio station, the radio communication state information including frequency information indicative of a frequency band used by the other radio station and waveform feature information indicative of a waveform feature of a radio signal transmitted from the other radio station; receiving a radio signal and calculating a waveform feature based on the waveform feature information, the waveform feature indicating whether the received radio signal includes the radio signal transmitted from the other radio station; and determining whether signal transmission from the radio station is available and specifying a radio resource to be used for the signal transmission based on the frequency information, the waveform feature information and/or the calculated waveform feature.

In one embodiment, the present method may further include receiving and demodulating a radio signal to generate a demodulated data symbol sequence, and determining reliability of the demodulated data symbol sequence, wherein the step of determining whether signal transmission from the radio station is available and specifying a radio resource to be used for the signal transmission comprises determining whether signal transmission from the radio station is available and specifying a radio resource to be used for the signal transmission based on the frequency information, the waveform feature information, the calculated waveform feature, the demodulated data symbol sequence and/or the reliability.

According to the embodiments, it is possible to improve frequency utilization efficiency through effective utilization of radio resources while reducing interference that may influence neighboring radio station regardless of radio communication systems being used by the neighboring radio stations.

BRIEF DESCRIPTION OF THE DRAWINGS

Other objects, features and advantages of the present invention will become more apparent from the following detailed description when read in conjunction with the accompanying drawings, in which:

FIG. 2A is a block diagram illustrating a radio station according to a first embodiment of the present invention;

FIG. 2B is a block diagram illustrating a controller in a radio station according to the first embodiment of the present invention;

FIG. 2C schematically illustrates exemplary waveform features;

FIG. 3 illustrates exemplary radio communication state information according to the first embodiment of the present invention;

DETAILED DESCRIPTION OF THE PREFERRED EMBODIMENTS

Preferred embodiments of the present invention will be described in detail below with reference to the accompanying drawings.

First Embodiment

System

Figure 1:
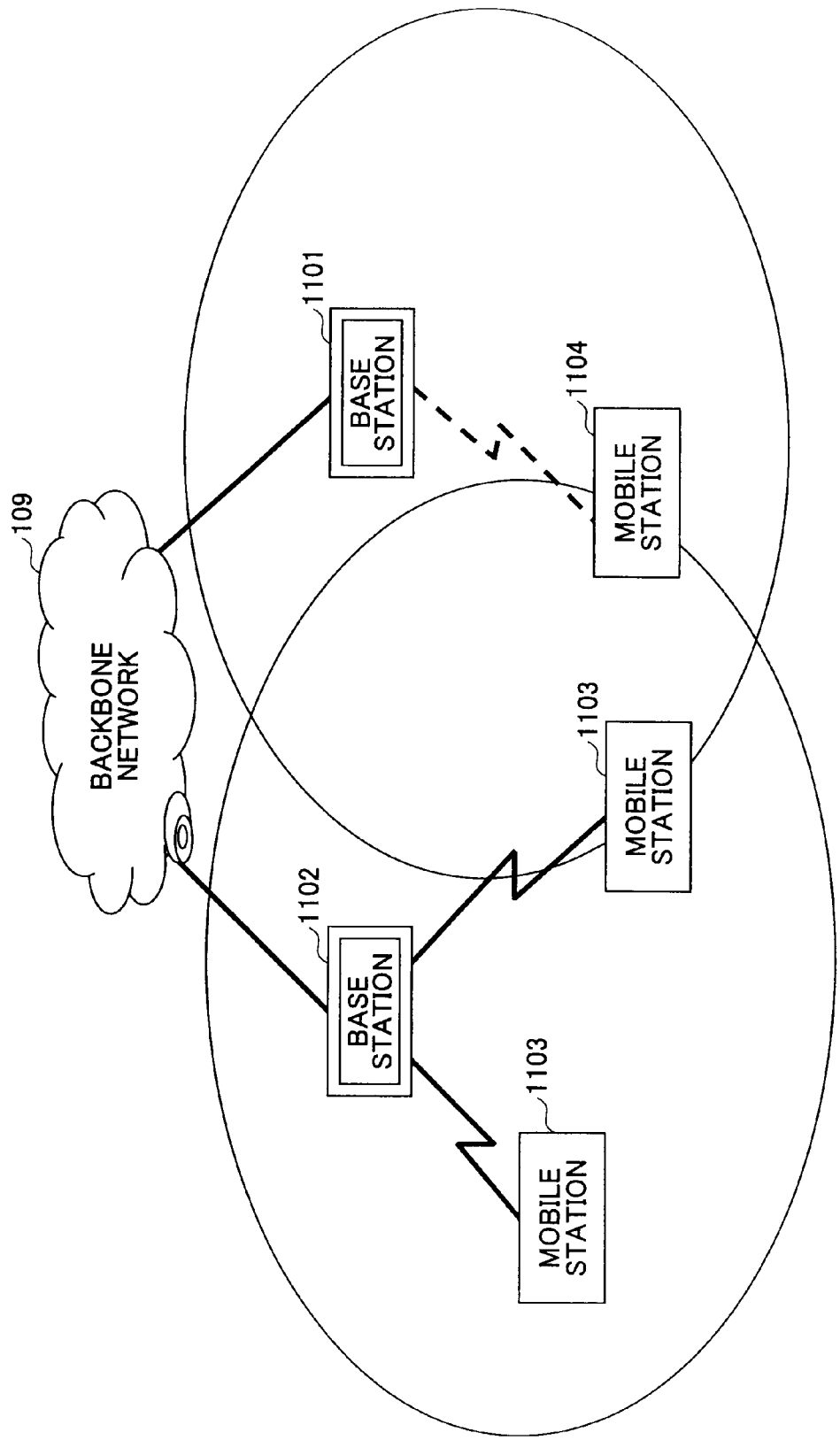
FIG. 1 illustrates an exemplary radio communication system.

FIG. 1 schematically illustrates an exemplary radio communication system. The radio communication system includes multiple base stations 1101, 1102 and multiple mobile stations 1103, 1104. For simplicity, it is assumed that the mobile station 1104 is in communication with one of the mobile stations 1103. The base stations 1101, 1102 may belong to a common radio communication system or different radio communication systems. Note that the base stations 1101, 1102 are configured to have the ability to acquire information on other radio stations (base stations or mobile stations) as needed. In the illustration, the base stations 1101, 1102 are connected to a backbone network 109 to acquire the information on other radio stations.

An information management server may be provided within the backbone network 109 for collectively managing information and returning necessary information in response to information acquisition requests from radio stations. Alternatively, base stations may directly connect to each other and exchange information without use of the information management server.

In FIG. 1, the base stations 1101, 1102 are in communication with the mobile stations 1103, 1104. In other embodiments, however, the base stations 1101, 1102 may be also in communication with fixed stations.

[Radio Station and Controller]

FIG. 2A is a block diagram illustrating a radio station 11 according to the first embodiment. The radio station 11, which is connected to a backbone network 109, includes a controller 10, an antenna 104, a transmission and reception splitter unit 105, a parameter control unit 106, a modulation unit 107 and a signal generation unit 108. Signals incoming to the radio station 11 via the antenna 104 are supplied to the controller 10 through the transmission and reception splitter unit 105. The controller 10 determines availability of signal transmissions based on analysis information on received signals and radio communication state information obtained from the backbone network 109. If the controller 10 determines that signals may be transmitted, the controller 10 determines some radio resource parameters to be applied to the signal transmissions. The determined radio resource parameters, which may be relevant to data modulation schemes, frequency resource blocks, transmit power and/or others, are supplied to the parameter control unit 106.

Transmission data to be transmitted from the radio station 11 is modulated at the modulation unit 107 and converted into radio signals at the signal generation unit 108. It will be appreciated by those skilled in the art that the transmission data may be subjected to not only the modulation but also other operations such as encoding and interleaving in practice. Transmission signals generated in accordance with the radio resource parameters supplied from the parameter control unit 106 are transmitted from the antenna 104 to a communication opponent radio station through the transmission and reception splitter unit 105.

FIG. 2B illustrates the controller 10 in FIG. 2A in detail. The controller 10 includes an information acquisition unit 101, a waveform information extraction unit 102 and a radio resource parameter determination unit 103.

The information acquisition unit 101 is connected to the backbone network 109 in any connection manner including, but not limited to, connections via a wired channel and a wireless channel. The backbone network 109 may mean a network over which connected radio stations can exchange information with each other. The information acquisition unit 101 acquires radio communication state information on neighboring radio stations via the backbone network 109. The radio communication state information may include at least frequency usage state information and feature information on signals used by the neighboring radio stations. In addition, the radio communication state information may include reception quality information on the neighboring radio stations and/or communication traffic information, for example.

The waveform information extraction unit 102 calculates waveform features of incoming signals based on the acquired feature information on signals used by the neighboring radio stations.

FIG. 3 illustrates exemplary radio communication state information. The frequency usage state information indicates frequency usage states of neighboring radio stations. The frequency usage state information indicates frequency usage states during and certain time periods after extraction of waveform features at the waveform information extraction unit 102. The feature information indicates waveform features of signals actually transmitted at frequencies in use as indicated in the frequency usage state information. The waveform features relate to statistical characteristics of signal waveforms. Cyclostationarity derived from the second order periodic autocorrelations, variances of signal amplitudes, frequency correlations and/or others may be used as the waveform features. Also, the frequency usage state information and the feature information may be stored in a memory device provided in a radio station or a controller for utilization of the historical information. The feature information is described in detail below.

In FIG. 2B, the radio resource parameter determination unit 103 determines availability of data transmissions and specifies some radio resource parameters applied to the data transmissions based on the radio communication state information obtained from the information acquisition unit 101 and the waveform features obtained from the waveform information extraction unit 102. Then, the radio resource parameter determination unit 102 supplies the specified radio resource parameters to the parameter control unit 106 in FIG. 2A. The radio resource parameters specified by the radio resource parameter determination unit 103 may include, but are not limited to, a center frequency, a bandwidth, transmit power, a modulation scheme and a coding scheme. Specific parameter determination schemes are described in detail below.

[Waveform Feature]

Signal waveform may be determined based on various parameters such as a center frequency, a frequency bandwidth, transmit power, a modulation scheme and a transmission information symbol. In other words, the signal waveform may include some features of the above-stated parameters. For example, the above-stated Japan Laid-Open Patent Publication No. 2006-222665 discloses a scheme for calculating periodic autocorrelations for signals and determining the presence of the signals based on features of the cyclostationarity of the signals. The disclosed scheme utilizes the fact that if only parameters specific to calculation of the periodic autocorrelations are utilized, the periodic autocorrelations can have greater values. Also, the above-stated Japan Laid-Open Patent Publication No. 2008-061214 proposes means for providing different cyclostationarity features for signals complying with a common modulation scheme. However, these schemes are simply illustrative, and feature measures indicative of signal waveform features can be represented in any other manner such as signal correlations or other statistics.

FIG. 2C schematically illustrates some cyclostationarity features caused due to some influences of filters as one example of the signal features. In FIG. 2C (1), an exemplary frequency spectrum of a signal having bandwidth B Hz band-limited by means of an ideal filter is illustrated. In the case where such an ideal filter is used, the frequency spectrum has a rectangular shape. In practice, such steep spectrum can hardly be implemented. Normally, a filter having a loosely sloped spectrum may be used for band-limiting. In FIG. 2C (2), an exemplary frequency spectrum of a signal band-limited by means of a practically used normal filter is illustrated. As illustrated in FIG. 2C (2), the frequency spectrum corresponding to such a normal filter has a wider frequency band than the ideal filter. In the wider frequency band, the illustrated right flared area P and left flared area P' have the same signal components, and the illustrated right flared area Q and left flared area Q' have the same signal components. Accordingly, if the signal in FIG. 2C (2) is frequency-shifted by B Hz as illustrated in FIG. 2C (3), the area P' in FIG. 2C (3) would have the same signal components as the area P in FIG. 2C (2), and the area Q' in FIG. 2C (3) would have the same signal components as the area Q in FIG. 2C (2).

In this manner, for signals band-limited by means of filters, an original signal may be correlated with a signal frequency-shifted from the original signal (periodic autocorrelation). This correlation value can serve as a waveform feature. In the illustration, the correlation between a certain signal and a signal frequency-shifted from the certain signal has been observed, but the certain signal may be time-shifted. In the first embodiment, the above-stated correlations are used to determine whether received signals may include some system signals.

The controller according to the first embodiment can calculate the waveform features for received signals by using conventional techniques as disclosed in Japan Laid-Open Patent Publication No. 2006-222665 and in Japan Laid-Open Patent Publication No. 2008-061214. Specifically, when a neighboring radio station transmits a signal having a certain cyclostationarity feature, a radio station including the controller according to the first embodiment acquires specific parameter information via a backbone network and uses the acquired specific parameter information to calculate a periodic autocorrelation of a received signal. If the received signal includes the signal transmitted from the neighboring radio station, the calculated periodic autocorrelation would have a value greater than a threshold. On the other hand, if the received signal does not include the signal transmitted from the neighboring radio station or if the received signal includes a negligibly tiny portion of the transmitted signal, the calculated periodic autocorrelation would not exceed the threshold, so that the transmitted signal can be detected. In general, the accurate feature detection based on signal waveform information such as the cyclostationarity feature can be effected even for low signal power relative to noise power in received signals, compared with signal detection based on receive power as utilized in the conventional CSMA/CA. In addition, when such a neighboring radio station transmits signals, a certain cyclostationarity feature is emphasized. Accordingly, direct communications between radio stations in different radio communication systems can be fulfilled through improved detection accuracy and/or by using the feature itself as information.

Instead of or in addition to the cyclostationarity derived from a correlation between a certain signal and a signal shifted from the certain signal in any direction, signal amplitude variances, that is, second order cumulants, may be utilized as statistics available to the waveform features. Roughly speaking, the second order cumulant corresponds to a variance of possible amplitudes. For example, signals having extremely high PAPRs (Peak to Average Power Ratios) such as OFDM signals may have second order cumulants significantly different from those of constant envelope signals such as single-carrier signals or noise. The former may have various amplitudes and thus lead to a greater variance while the latter may have a smaller variance. This property can be used to determine whether received signals include OFDM signals. For example, the information acquisition unit 101 in the controller 10 may acquire temporal variation characteristics of the second order cumulants for signals transmitted from neighboring radio stations as feature information of the second order cumulants for the signals and set the temporal variation characteristics to a threshold. The waveform information extraction unit 102 compares the temporal variation characteristics of the second order cumulants with such a threshold. If the temporal variation characteristics are greater than the threshold, the waveform information extraction unit 102 determines that the received signal includes the OFDM signal. On the other hand, if the temporal variation characteristics are not greater than the threshold, the waveform information extraction unit 102 determines that the received signal does not include the OFDM signal. In this manner, the OFDM signals can be detected. Also, as in the case of the cyclostationarity, when neighboring radio stations transmit signals, the neighboring radio stations may attach a feature of a certain second order cumulant to the transmitted signals by controlling amplitudes such that the variance of amplitudes can be equal to a predefined value. As a result, even if the radio stations utilize different radio communication systems, the radio stations can exchange information directly through improved detection accuracy and/or through use of the feature itself.

Instead of or in addition to the cyclostationarity and the second order cumulants, signal frequency correlation characteristics may be also utilized as statistics available for the waveform features, as disclosed in IEEE 802.22 Working Group of the LAN MAN Standards Committee, "IEEE P802.22/D0.1 Draft Standard for Wireless Regional Area Networks Part 22: Cognitive Wireless RAN Medium Access Control (MAC) and Physical Layer (PHY) specifications: Policies and procedures for operation in the TV bands", The Institute of Electrical and Electronics Engineers, May 2006, for example. In the case of the frequency correlation characteristics, biases of signal power are attached to subcarrier frequency components of multi-carrier signals such as OFDM signals. In this case, a radio station can calculate frequency correlations of received signals and detect peak values, the number of peaks, frequency intervals between the peaks and/or others as the waveform features.

As stated above, the waveform feature representative of a feature of signal waveform may be based on signal correlations and/or statistics such as variances.

[Operation]

Figure 4:
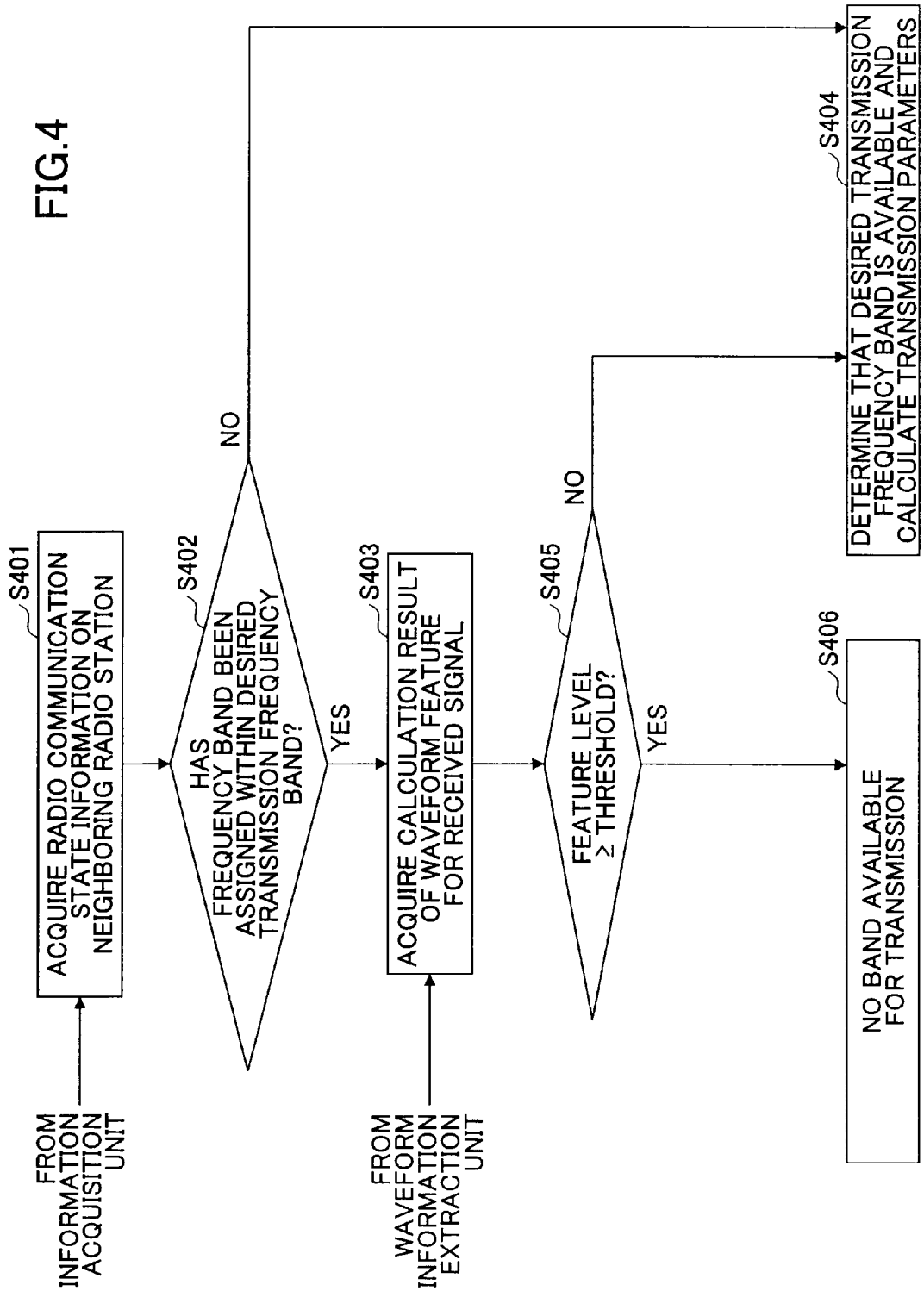
FIG. 4 is a flowchart of an exemplary control procedure of a radio resource parameter determination unit in a controller according to the first embodiment.

FIG. 4 is a flowchart of an exemplary control procedure at the radio resource parameter determination unit 103 in the controller 10. At step S401, the radio resource parameter determination unit 103 acquires radio communication state information on neighboring radio stations from the information acquisition unit 101. At step S402, based on frequency band usage state information in the radio communication state information, the radio resource parameter determination unit 103 determines whether a transmission band desired by the radio station 11 includes bands already assigned to the neighboring radio stations. If the desired transmission band does not include the assigned bands, at step S404, the radio resource parameter determination unit 103 determines that the desired transmission band is available to the radio station 11 for data transmission.

The term "desired transmission band" used herein means a frequency band that the radio station 11 desires to use for communications with an opponent radio station. In one example, the desired transmission band may correspond to a frequency band where signals transmitted from the radio station 11 to the opponent radio station over a channel can be received at higher than or equal to a predefined power level. In another example, the desired transmission band may correspond to a frequency band available to the radio station 11 in the case where utilization of certain frequency bands is limited due to hardware restrictions or some other restrictions. Also, the desired transmission band can be set to have a frequency bandwidth where a desired communication capacity is achievable within a frequency band available to the radio station 11 in terms of hardware. In this case, the frequency bandwidth may be requested to be one continuous frequency band or a set of frequency bands for enabling the desired communication capacity through their simultaneous utilization.

On the other hand, if the desired transmission band includes the assigned band at step S402, the radio resource parameter determination unit 103 acquires feature information on received signals from the waveform information extraction unit 102 at step S403 and compares a calculated feature level in the acquired feature information with a threshold at step S405. If the feature level exceeds the threshold, at step S406, the radio resource parameter determination unit 103 disables data transmission.

For example, it is assumed that the base station 1101 in FIG. 1 includes the controller 10 to analyze the other base station 1102. The controller 10 calculates the feature level for signals transmitted from the base station 1102. If the feature level is high, the radio signals transmitted from the base station 1102 would arrive at the base station 1101 sufficiently. This means that if the base station 1101 uses that frequency band to transmit signals, significant interference might arise to communications of the base station 1102. For this reason, if the feature level exceeds the threshold at step S405, that frequency band is made unavailable for data transmission by the radio station 1101. On the other hand, if the feature level does not exceed the threshold, at step S404, the controller 10 enables the data transmission and specifies transmission parameters to be applied.

The feature information corresponds to a set of calculated features that the waveform information extraction unit 102 obtains periodically or within a predefined period before initiation of control by the controller 10. In order to specify the transmission parameters to be applied, the amount of transmission data transmitted from the radio station 11 to an opponent radio station and/or channel characteristics between the radio station 11 and the opponent radio station may be also taken into account. Specifically, available frequency bands and time periods are determined in accordance with the above-stated control procedure, and a transmit power level, a modulation scheme and a coding scheme are determined to achieve a desired transmission data rate. Also, if the above-stated radio communication state information includes reception quality information and/or communication traffic information around neighboring radio stations, the transmit power level, the modulation scheme and the coding scheme may be determined in consideration of these information items.

According to the first embodiment, even in the case where different radio communication systems fail to communicate with each other, each radio station utilizes the waveform features of signals used in the radio communication systems to identify the radio communication systems and to autonomously determine which radio resources are available to avoid interference for transmitted signals. In this manner, without complicated control as needed in the centralized control, more radio resources become available than with the distributed control that cannot collect sufficient signal information, resulting in improved frequency utilization efficiency.

[Variation 1.1]

Figure 5:
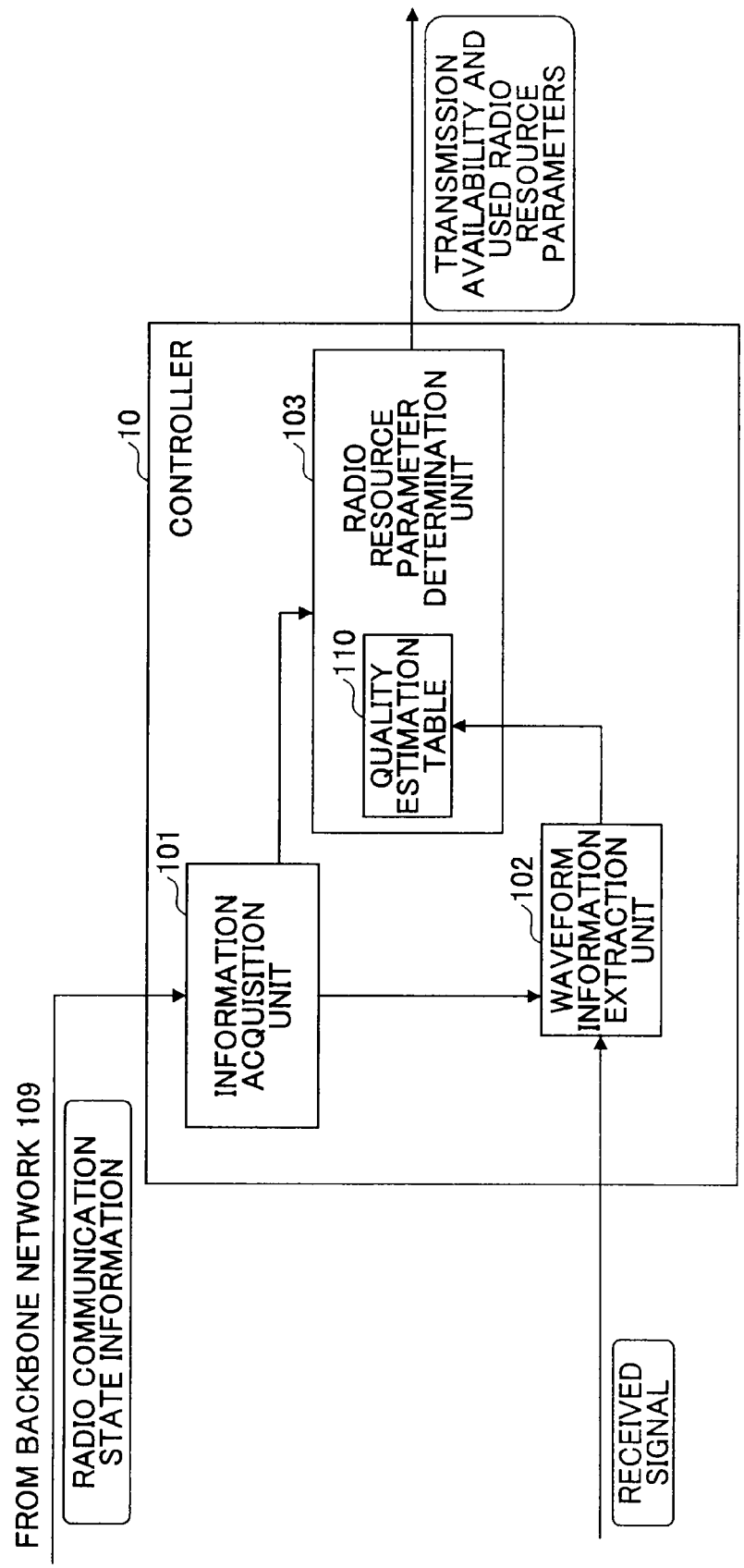
FIG. 5 is a block diagram illustrating a controller in a radio station according to a first variation 1.1 of the first embodiment.

FIG. 5 illustrates a controller 10 according to a first variation 1.1 of the first embodiment. In this variation, the radio resource parameter determination unit 103 includes a quality estimation table 110. However, the inclusion of the quality estimation table 110 in the radio resource parameter determination unit 103 is not essential to this variation. The quality estimation table 110 may be provided in or out of the radio resource parameter determination unit 103. Preferably, the quality estimation table 110 may be accommodated in the radio resource parameter determination unit 103 as illustrated in FIG. 5 so that the radio resource parameter determination unit 103 can utilize entries in the quality estimation table 110 easily.

The quality estimation table 110 stores correspondence between waveform features supplied from the waveform information extraction unit 102 and qualities of channels between the radio station 11 and neighboring radio stations. In response to reception of calculated features from the waveform information extraction unit 102, the radio resource parameter determination unit 103 estimates the quality of a channel between the radio station 11 and a neighboring radio station that has transmitted a signal having the waveform feature with reference to the possessed quality estimation table 110.

Figure 6:
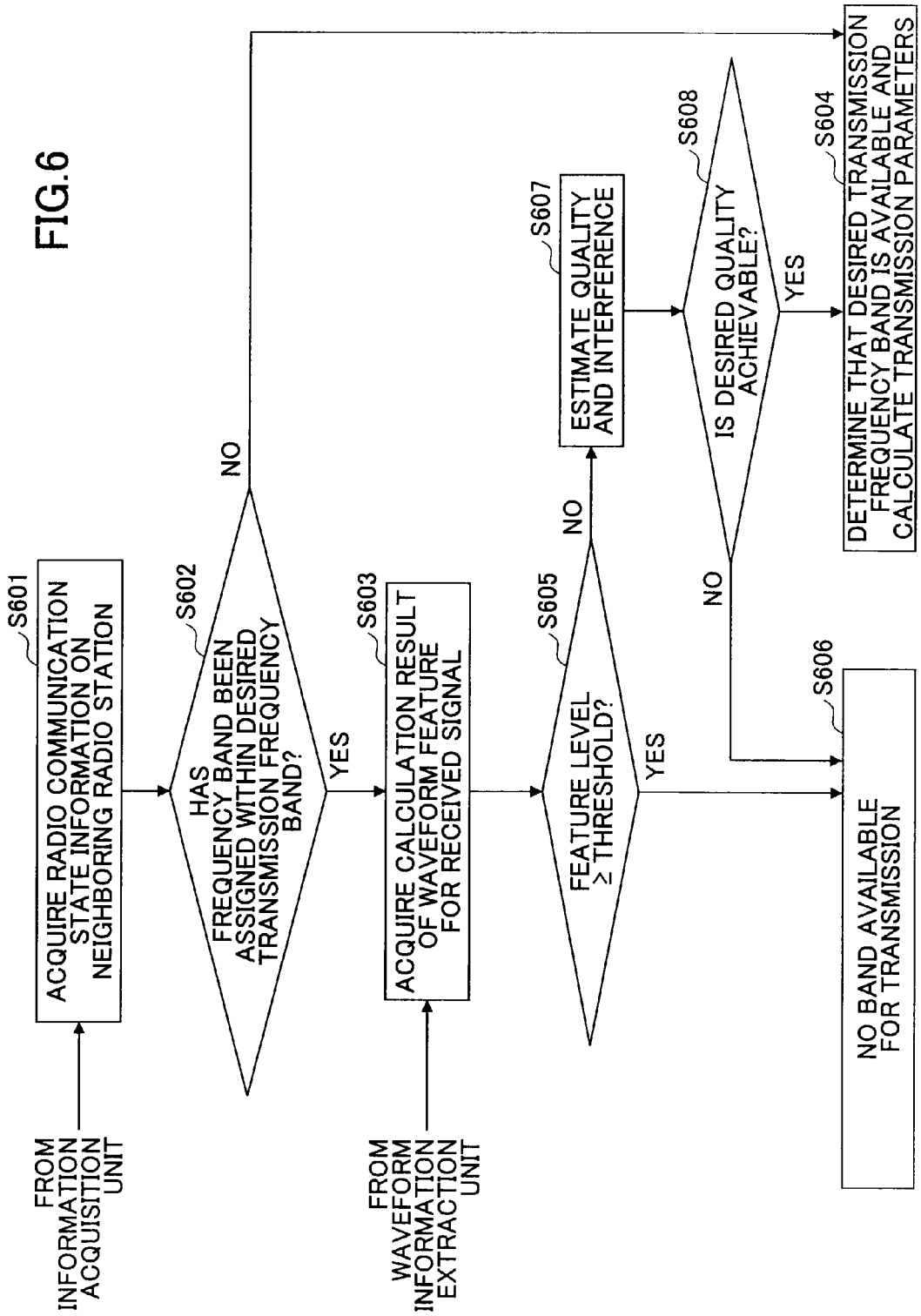
FIG. 6 is a flowchart of an exemplary control procedure of a radio resource parameter determination unit in a controller according to the first variation 1.1.

FIG. 6 is a flowchart of an exemplary control procedure at the radio resource parameter determination unit 103 according to the first variation. For simplicity, it is assumed that the base station 1101 in FIG. 1 includes a controller 10 to analyze signals from the other base station 1102. At step S601, the radio resource parameter determination unit 103 acquires radio communication state information on neighboring radio stations from the information acquisition unit 101. At step S602, based on frequency band usage state information in the radio communication state information, the radio resource parameter determination unit 103 determines whether a frequency band available to the radio station 1101 for transmission includes a frequency band assigned for the neighboring base station 1102. If the available frequency band does not include the frequency band assigned for the neighboring base station 102, at step S604, the radio resource parameter determination unit 103 enables data transmissions. On the other hand, if the available frequency band includes the frequency band assigned for the neighboring base station 1102 at step S602, the radio resource parameter determination unit 103 acquires feature information from the waveform information extraction unit 102 at step S603 and compares a calculated feature level with a threshold at step S605. If the feature level exceeds the threshold, at step S606, the radio resource parameter determination unit 103 disables data transmission.

On the other hand, if the feature level does not exceed the threshold, the flow proceeds to step S607. At step S607, the radio resource parameter determination unit 103 uses the feature level and the quality estimation table 110 to estimate whether signal transmissions from the base station 1101 may lead to significant influence on the base station 1102. In this embodiment, the quality estimation table 110 is arranged to manage channel quality (e.g., CQI) between the base station 1101 and each of the radio stations including the base station 1102. Signals transmitted from the different radio stations can be identified based on the feature information. In this embodiment, the single other radio station 1102 is provided, but any number of other radio stations may be provided. For example, in the embodiment illustrated in FIG. 1, the mobile stations

1103 may serve as the other radio stations. In any case, at step S607, the radio resource parameter determination unit 103 estimates an interference level that may influence the base station 1102 under the situation where the base station 1101 transmits signals based on the quality of signals received from the base station 1102. At step S608, the base station 1101 (or the radio station 11) determines whether a desired communication quality, such as a desired data rate, can be achieved under a transmit power constraint for limiting the caused interference to be below a predefined level. If it is determined that the desired communication quality cannot be achieved, at step S606, the radio resource parameter determination unit 103 disables data transmissions. On the other hand, if it is determined that the desired communication quality can be achieved, at step S604, the radio resource parameter determination unit 103 enables the data transmission and specifies transmission parameters to be used under the constraint.

The threshold applied in step S605 of the first variation may be set to be greater than the threshold applied in step S405 in FIG. 4. As is obvious from the illustrations in FIGS. 4 and 6, the flows may proceed to steps S406 and S606 with a higher likelihood in the case of the threshold for comparison with the feature level being set to be smaller, which may cause the base station 1101 to have a lower likelihood of transmitting signals. On the other hand, the flows may proceed to steps S404 and S607 with a higher likelihood in the case of the threshold being set to be greater, which may cause the base station 1101 to have a higher likelihood of transmitting signals. In the first variation, the base station 1101 determines availability of transmission from the base station 1101 after determining the presence of signals from the other base stations at step S605 based on reception quality. Thus, the flow in FIG. 6 is preferred to that in FIG. 4 in that the flow in FIG. 6 may lead to more transmission opportunities than the flow in FIG. 4. Even if there is some degree of signals from the other base stations, the interference influencing the other base stations can be reduced by flexibly controlling some parameters such as transmit power depending on channel characteristics between the base station 1101 and the other base stations. As a result, more communication opportunities and higher frequency utilization efficiency can be achieved.

[Variation 1.2]

Figure 7:
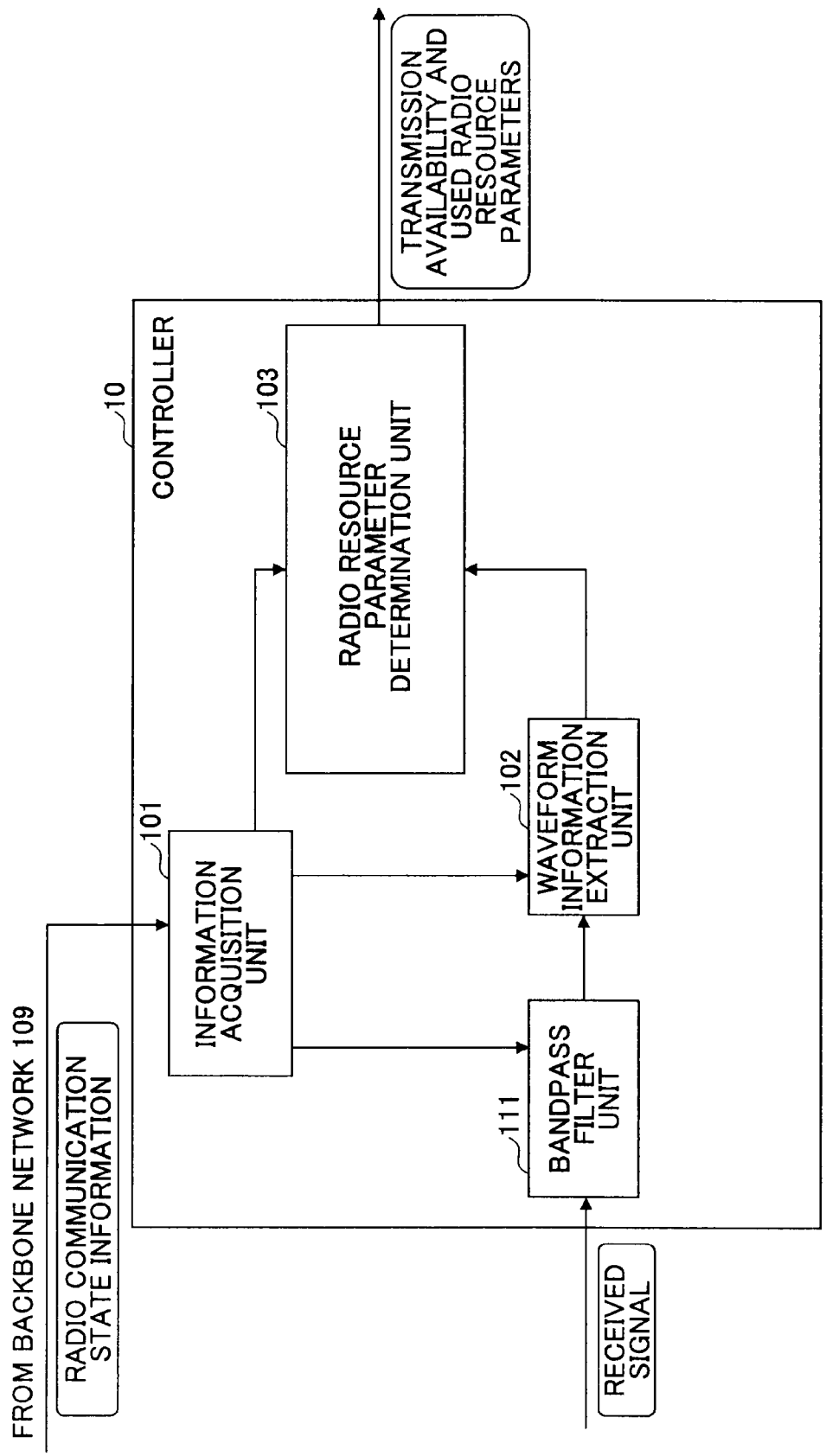
FIG. 7 is a block diagram illustrating a controller in a radio station according to a second variation 1.2 of the first embodiment.

FIG. 7 illustrates a controller 10 according to a second variation 1.2 of the first embodiment. In this variation, the controller 10 includes a bandpass filter unit 111 provided ahead of the waveform extraction unit 102.

Signals incoming to the antenna 104 in the radio station 11 are supplied to the bandpass filter unit 111 via the transmission and reception splitter unit 105 for band-limiting. The band-limiting means operations for enabling passage of a frequency component of an incoming signal corresponding to a pass band and for disabling passage of the other frequency components. The bandpass filter unit 111 may be dedicated to the controller 10 or shared with a noise removal filter for use in normal radio communications.

Figure 8:
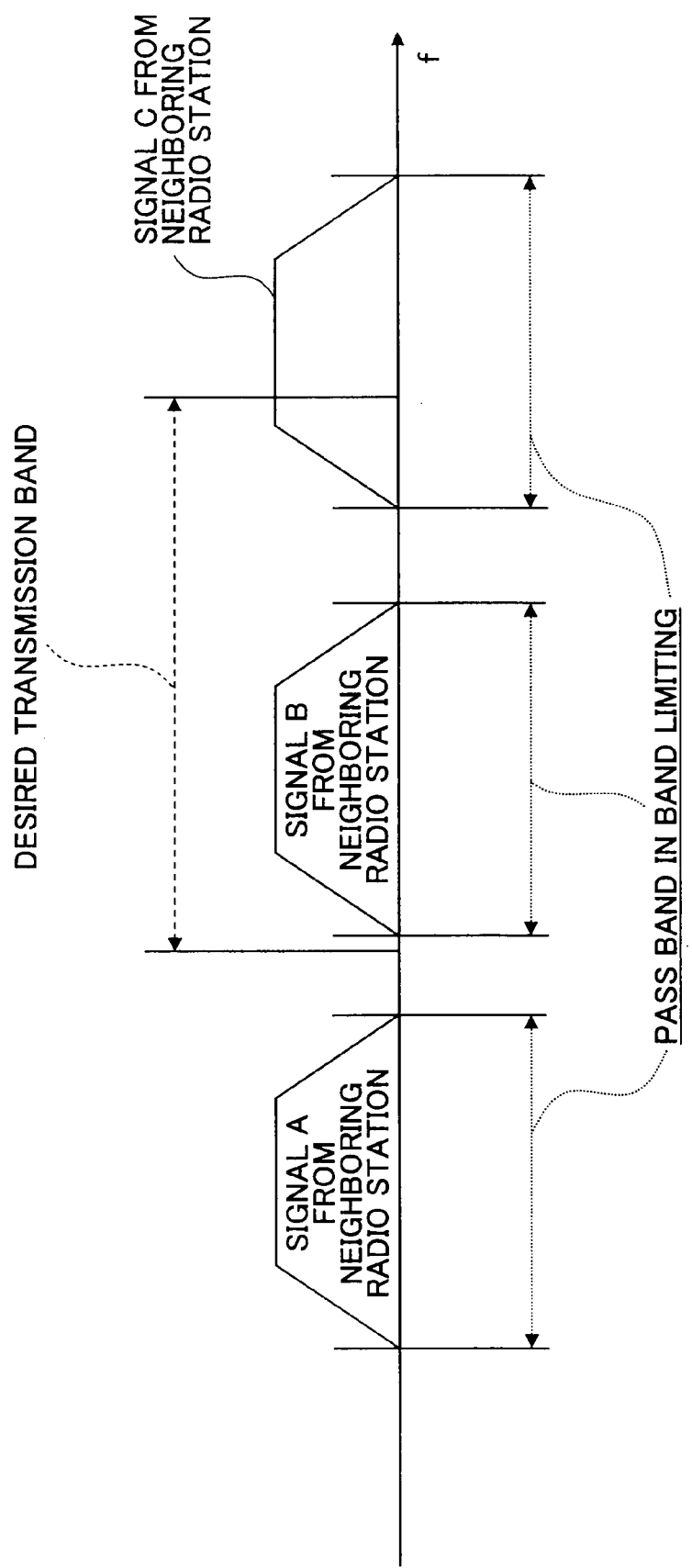
FIG. 8 schematically illustrates an exemplary pass band in a bandpass filter unit according to the second variation 1.2.

FIG. 8 schematically illustrates exemplary band-limiting operations at the bandpass filter unit 111. As stated above, the information acquisition unit 101 acquires frequency usage state information on neighboring radio stations. Based on the frequency usage state information, pass bands for the radio stations may be set to frequency bands used by the neighboring radio stations, as illustrated in an exemplary pass band setup in FIG. 8. A band-limited signal is supplied to the waveform information extraction unit 102 to calculate a waveform feature. As a result, some influences of an unnecessary wave and a noise component existing in an out-of-band of the original signal can be removed, which may make the calculation of the waveform feature more accurate. In addition, the same calculation is performed on all signals possibly existing around the radio station 11, which can obtain a larger amount of information and fulfill more accurate resource control.

Figure 9:
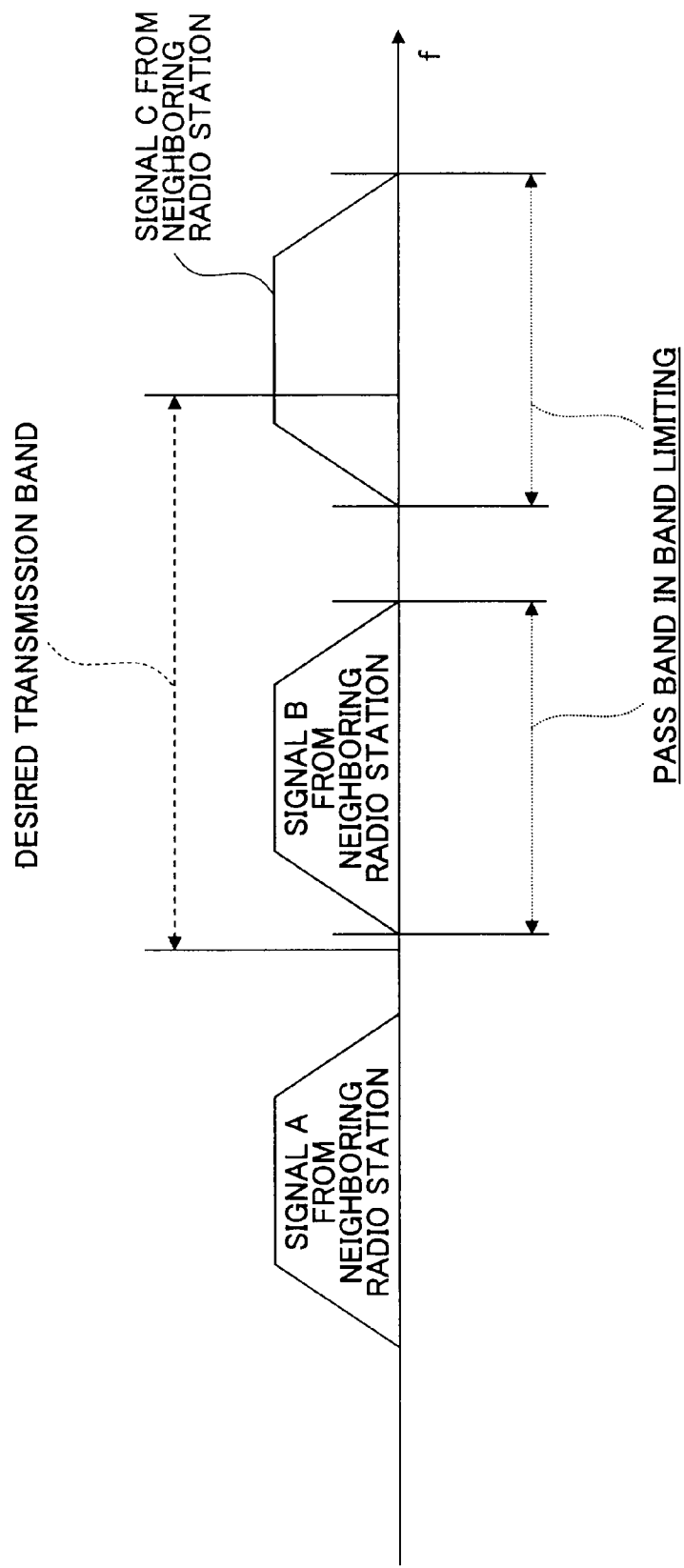
FIG. 9 schematically illustrates another exemplary pass band in the bandpass filter unit according to the second variation 1.2.

As illustrated in an exemplary pass band setup in FIG. 9, the bandpass filter unit 111 may set the pass bands in a scheme different from the illustration in FIG. 8. In the example illustrated in FIG. 9, frequency bands for radio stations using a portion or the whole of a transmission band desired by the radio station 11 including the controller 10, such as the base station 1101, may be set as the pass bands. In the illustrated example, signals B and C from neighboring radio stations are included in the desired transmission frequency. Accordingly, the bandpass filter unit 111 is configured to pass signals B and C and filter out the other signals such as signal A from another neighboring radio station. According to such a band-limiting scheme, the waveform features can be calculated on only signals transmitted from neighboring radio stations that may possibly have some influences on the desired transmission band, resulting in a lesser amount of the calculation than the band-limiting scheme in FIG. 8. Also, signals existing in out-of-bands of the desired transmission band are ignored, and thus signals in bands having characteristics significantly different from the desired transmission band do not have to be taken into account. As a result, the feature calculation and the resource control suitable for the frequency band actually used to transmit signals can be achieved.

Figure 10:
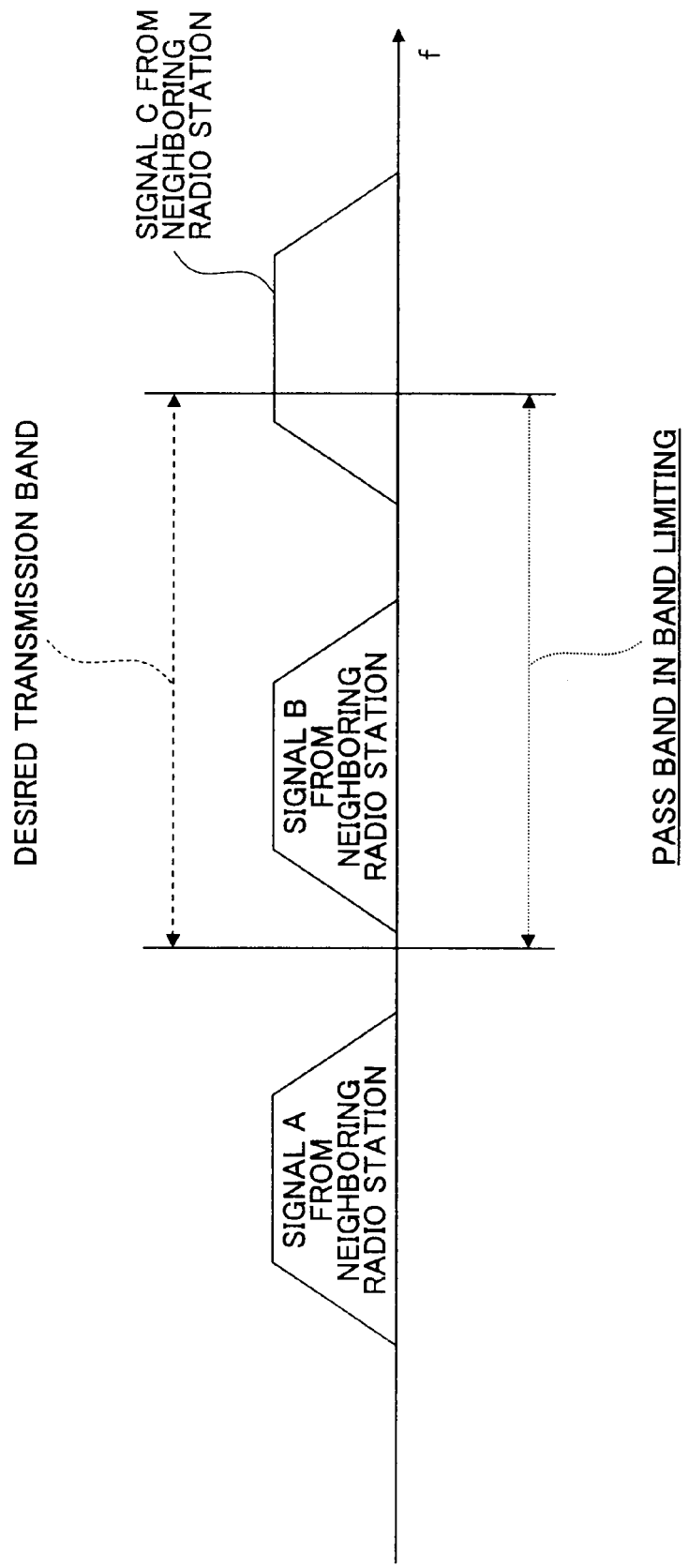
FIG. 10 schematically illustrates another exemplary pass band in the bandpass filter unit according to the second variation 1.2.

As illustrated in an exemplary pass band setup in FIG. 10, the bandpass filter unit 111 may set a pass band corresponding to a transmission band desired by the radio station 11 including the controller 10. According to such a band-limiting scheme, the waveform features have to be calculated for only signals existing within the desired transmission band. As a result, even if signals on which the radio station 11 has no information beforehand may be present in the band or if signals are shifted toward a band different from bands obtained from frequency usage state information due to frequency offset influence, the waveform features can be calculated. In these cases, when the bandpass filter unit 111 has the same characteristics as a filter used for transmission and reception in the radio station 11, the bandpass filter unit 111 in the controller 10 can be also used for the normal transmission and reception. On the other hand, the filter for the transmission and reception can be also used as the bandpass filter unit 111 in the controller 10.

[Variation 1.3]

In the third variation, the radio station 11 described in conjunction with FIG. 2A may serve as a base station or a mobile station. The controller 10 is provided in the radio station 11. Thus, the controller 10 according to the third variation may be provided in the base station or the mobile station.

Figure 11:
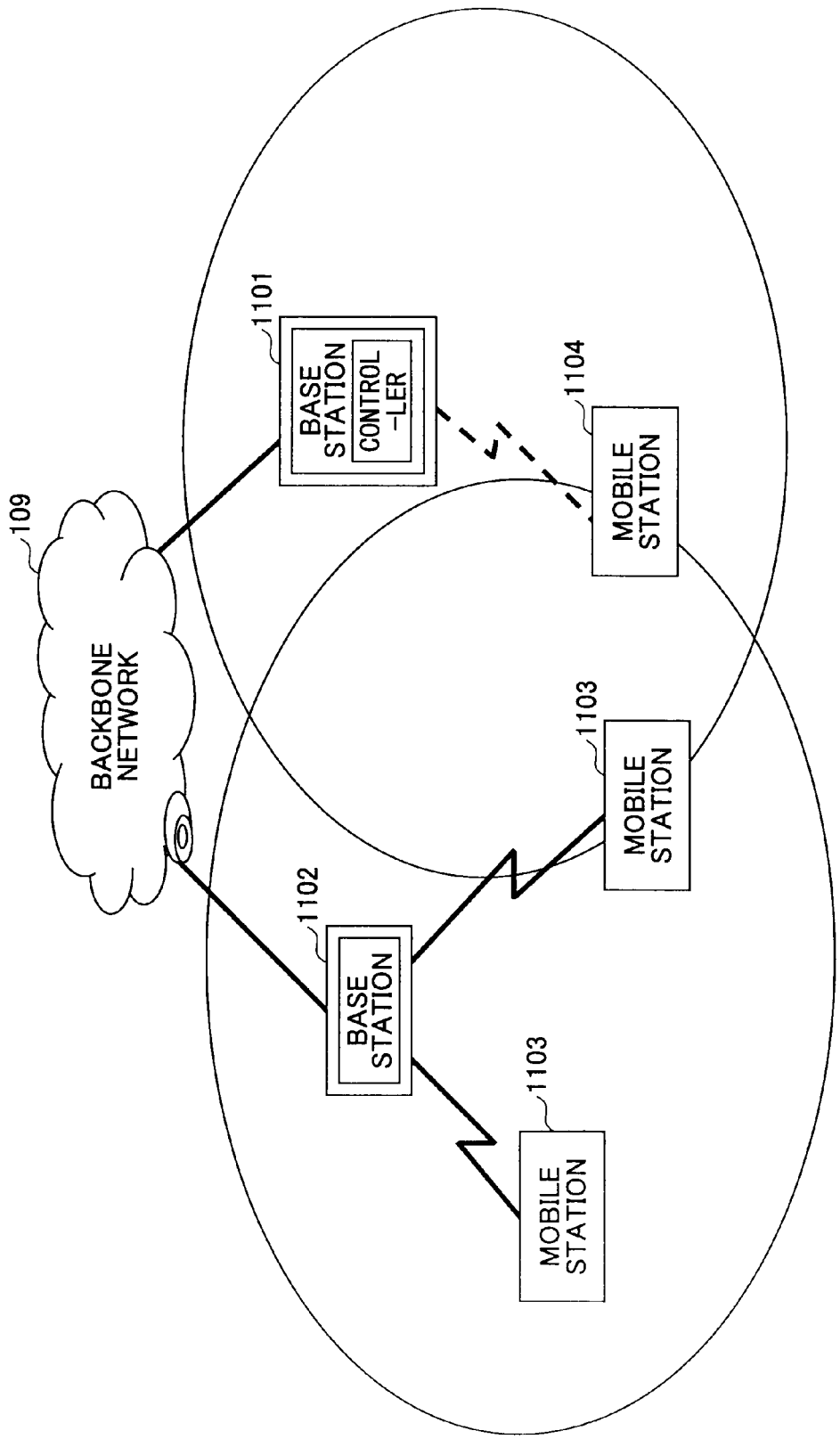
FIG. 11 schematically illustrates an exemplary radio resource shared environment corresponding to a certain base station including a controller.

FIG. 11 schematically illustrates that only a certain base station 1101 includes a controller. Note that the controller can acquire information regarding other radio stations, such as frequency information and waveform feature information, via the backbone network 109 as needed. The base station 1101 acquires radio communication state information on the base station 1102 and/or the mobile stations 1103 being in communication with the base station 1102 from the neighboring base station 1102 via the backbone network 109. The base station 1101 uses the acquired radio communication state information to calculate waveform features for signals transmitted from the base station 1102 and/or the mobile stations 1103. If the base station 1101 determines that transmissions from the base station 1101 to an opponent mobile station 1104 may cause interference influencing the base station 1102 and/or the mobile stations 1103, the base station 1101 defers the transmissions to the opponent mobile station 1104. On the other hand, if the base station 1101 determines that the transmission to the opponent mobile station 1104 may not cause the interference influencing the base station 1102 and/or the mobile stations 1103, the base station 1101 determines radio resource parameters and initiates the transmission to the opponent mobile station 1104.

According to this embodiment, the base station 1101 can comprehend radio communication states around itself accurately. If no interference arises, the base station 1101 can use resources used by the base station 1102 and/or the mobile stations 1103 to communicate with the opponent mobile station 1104. As a result, it is possible to not only improve utilization efficiency of radio resources but also avoid occurrence of the interference efficiently.

Figure 12:
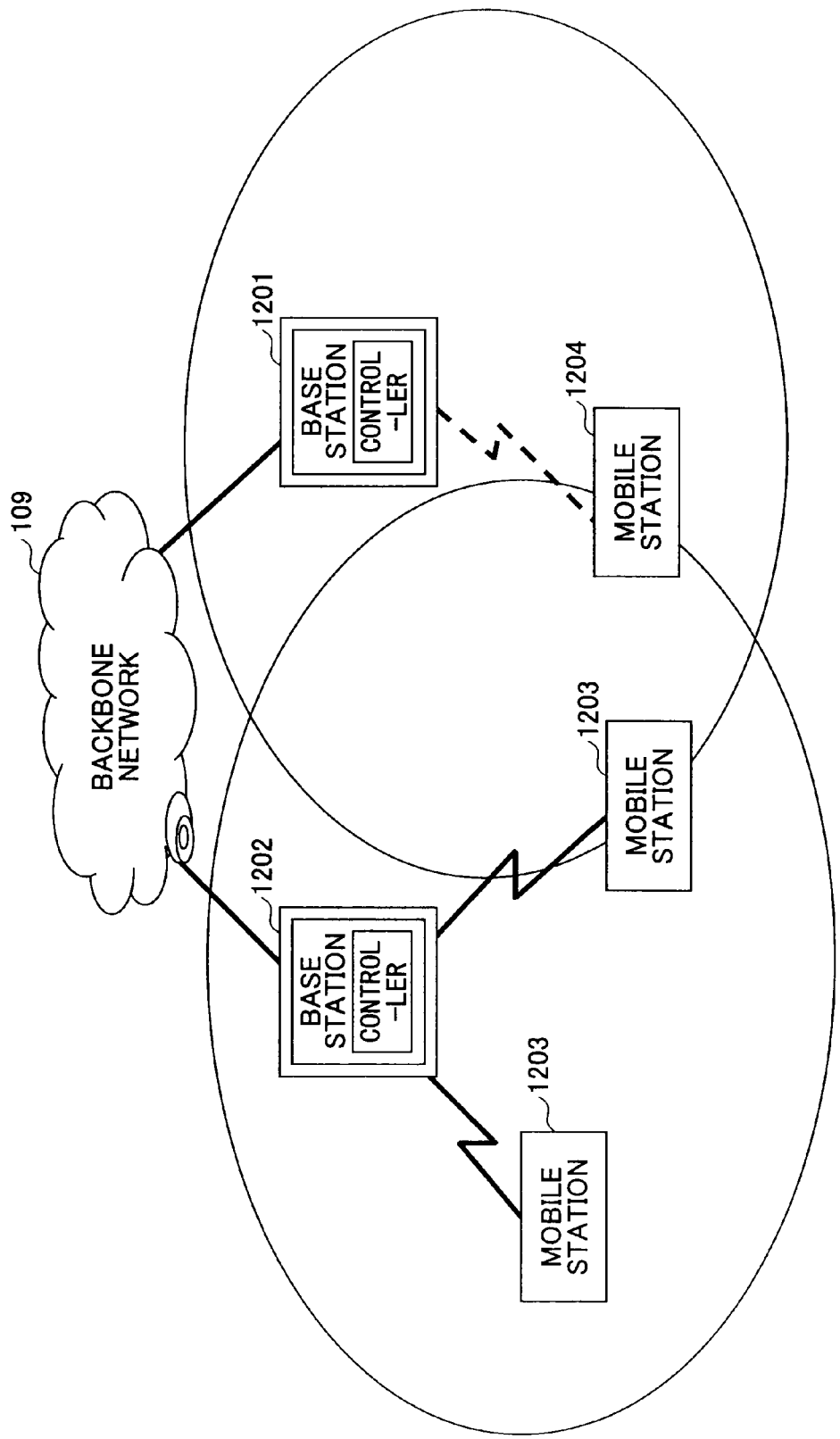
FIG. 12 schematically illustrates an exemplary radio resource shared environment corresponding to both base stations including controllers.

FIG. 12 illustrates another exemplary radio resource shared environment different from the illustration in FIG. 11. This radio resource shared environment is similar to FIG. 11, but both base stations include controllers 10 in FIG. 12. In other words, each radio station that can exchange information with other radio stations over the backbone network 109 includes the controller 10 according to the first embodiment. For this reason, the radio stations can determine the presence of signals transmitted from the other radio stations and avoid occurrence of interference, which can further improve utilization efficiency of radio resources.

Figure 13:
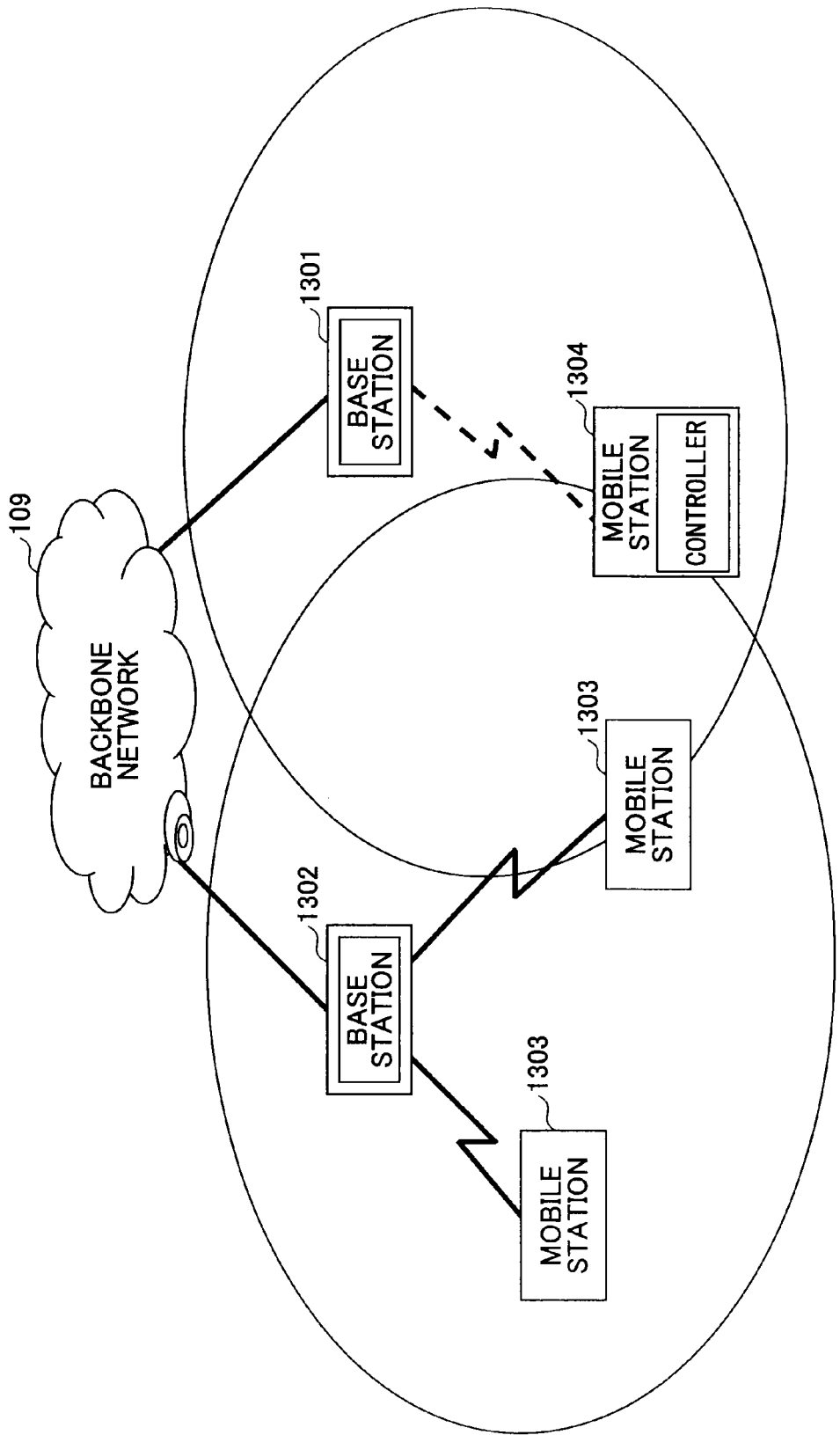
FIG. 13 schematically illustrates an exemplary radio resource shared environment corresponding to a mobile station including a controller.

FIG. 13 illustrates still another radio resource shared environment. In the embodiments illustrated in FIGS. 11 and 12, the base stations include the controllers, but in the embodiment illustrated in FIG. 13, the controller is provided in a mobile station 1304. Note that the controller 10 must acquire information regarding other radio stations, which is acquired from a radio channel via a base station 1301 connected to the backbone network 109. The controller operates similar to the flowcharts as described above in conjunction with FIGS. 4 and 6. The mobile station 1304 including the controller 10 of the first embodiment performs the above-stated operations for further reduction in influences on the neighboring radio station 1302 and/or the mobile stations 1303 due to interference caused by electric waves transmitted from the mobile station 1304. Also, for example, if a mobile station is connected to an adaptor connectable to the backbone network 109, the mobile station can connect to the backbone network 109. As a result, the utilization efficiency of radio resources can be improved in communications with opponent base stations, and occurrence of interference can be avoided.

Note that the embodiments illustrated in FIGS. 11-13 are not exclusively employed and the controller 10 may be provided in one or more radio stations.

Second Embodiment

Radio Station and Controller

Figure 14:
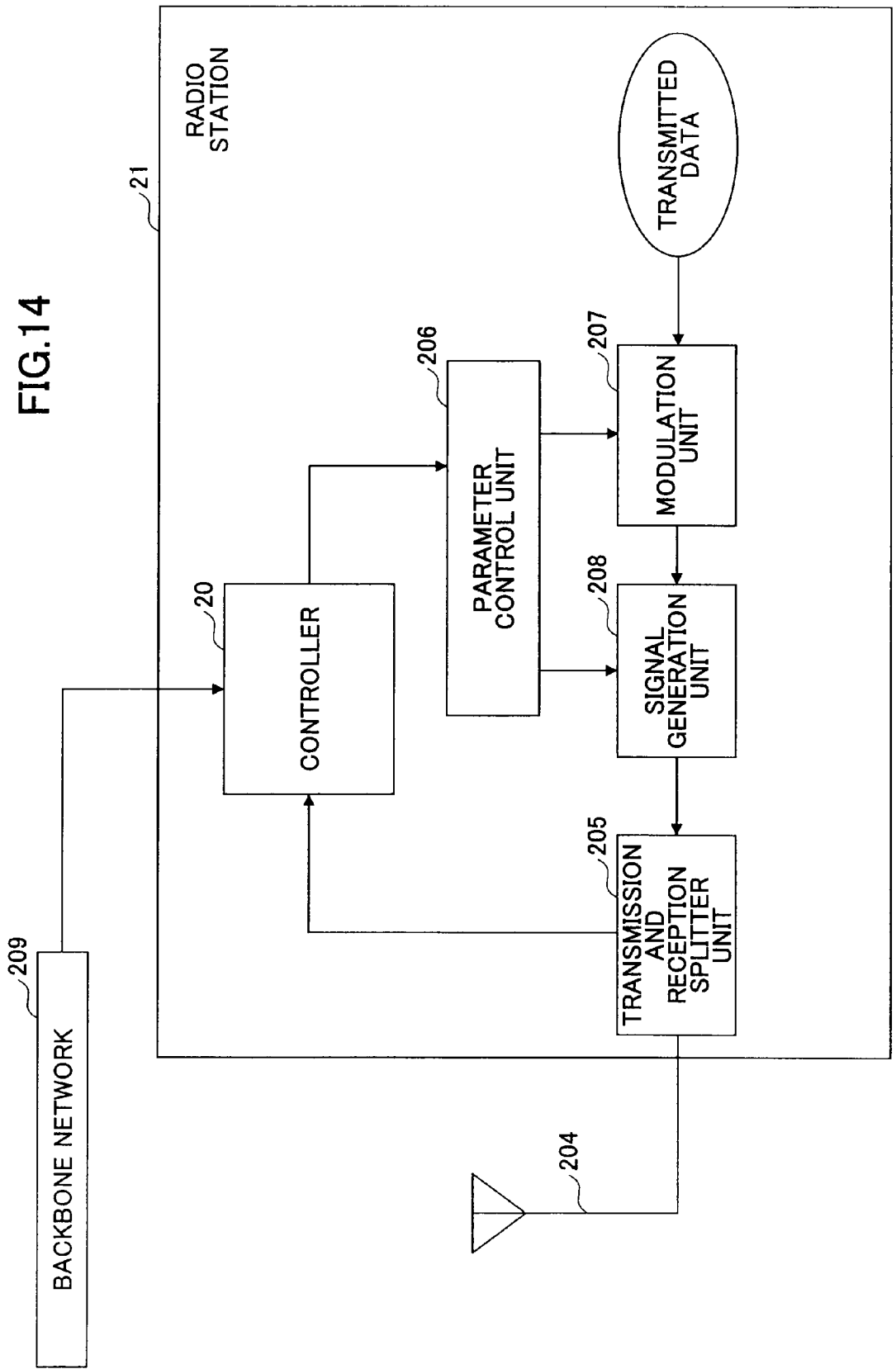
FIG. 14 is a block diagram illustrating a controller in a radio station according to a second embodiment of the present invention.

FIG. 14 is a block diagram illustrating a radio station 21 according to the second embodiment. The radio station 21, which is connected to a backbone network 209, includes a controller 20, an antenna 204, a transmission and reception splitter unit 205, a parameter control unit 206, a modulation unit 207 and a signal generation unit 208. A signal incoming to the antenna 204 is supplied to the controller 20 via the transmission and reception splitter unit 205. The controller 20 determines availability of signal transmissions based on analysis information of the received signal and radio communication state information acquired from the backbone network 209. If the signal transmissions are available, the controller 20 determines radio resource parameters for use in the signal transmissions. The determined radio resource parameters, for example, parameters for specifying a data modulation scheme, a frequency resource block, transmit power and others, are supplied to the parameter control unit 206.

Data to be transmitted from the radio station 21 is modulated at the modulation unit 207 and converted into radio signals at the signal generation unit 208. In practice, it would be obvious to those skilled in the art that other additional operations such as encoding and interleaving are carried out. Transmission signals generated in accordance with some parameters supplied from the parameter control unit 206 are transmitted through the transmission and reception splitter unit 205 from the antenna 204 to an opponent radio station communicating with the radio station 21.

Figure 15:
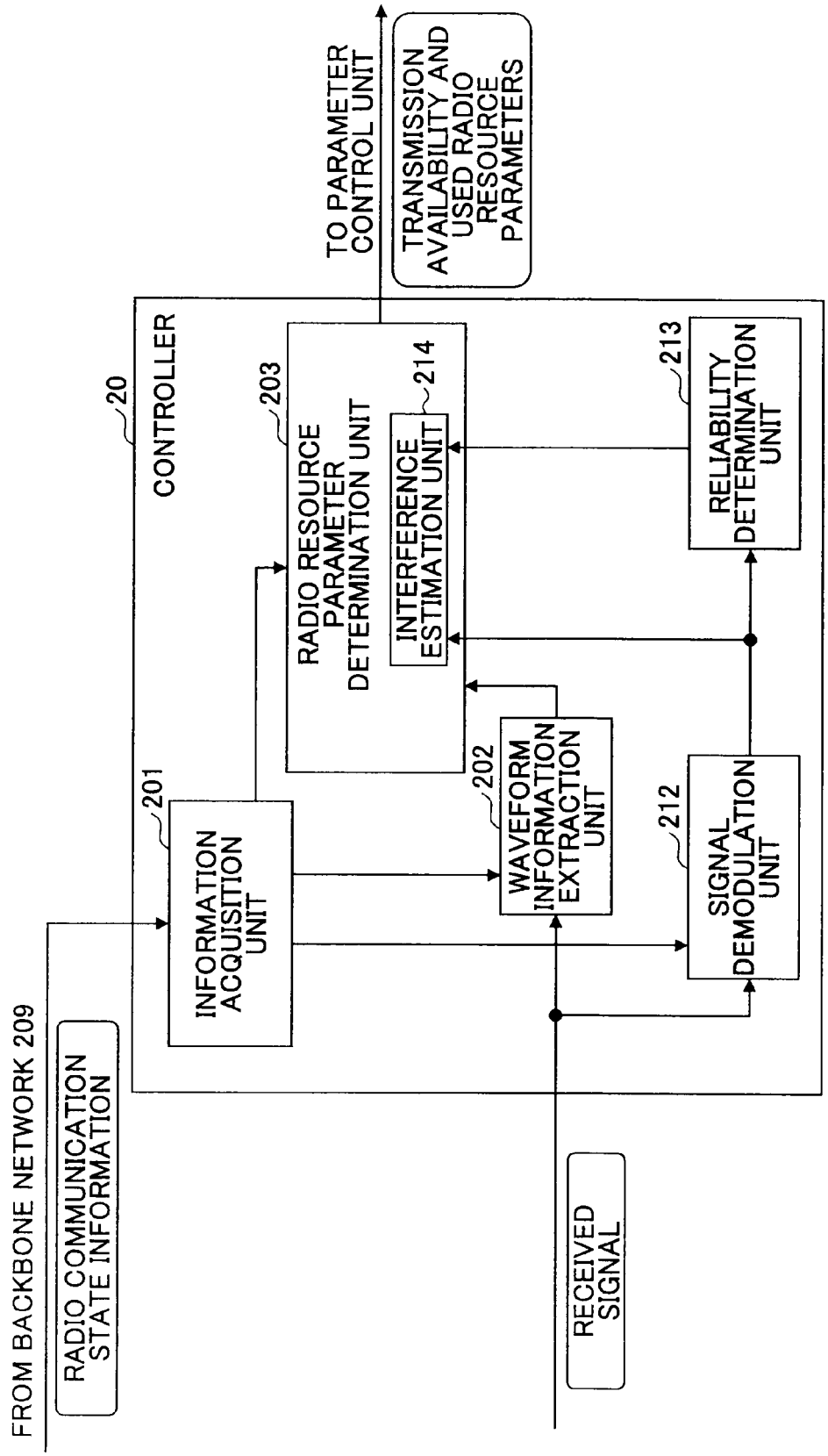
FIG. 15 is a block diagram illustrating a radio station including a controller according to the second embodiment.

FIG. 15 illustrates the controller 20 in the radio station 21 illustrated in FIG. 14 in detail. The controller 20 includes an information acquisition unit 201, a waveform information extraction unit 202, a radio resource parameter determination unit 203, a signal demodulation unit 212 and a reliability determination unit 213. Although an interference estimation unit 214 illustrated to in FIG. 15 is included in the radio resource parameter determination unit 203, this is not essential to the second embodiment. In other embodiments, the interference estimation unit 214 may be provided in or out of the controller 20.

The information acquisition unit 201 is connected to the backbone network 209 in any connection manner including, but not limited to, connections via a wired channel and a wireless channel. The backbone network 209 may mean a network over which connected radio stations can exchange information with each other. The information acquisition unit 201 acquires radio communication state information on neighboring radio stations via the backbone network 209. In the second embodiment, the radio communication state information may include not only frequency usage state information and feature information on signals used by the neighboring radio stations but also information necessary to demodulate signals transmitted from the neighboring radio stations. Specifically, the information necessary to demodulate signals transmitted from the neighboring radio stations may consist of some parameters for specifying a data modulation scheme, a channel coding scheme, a frequency band (resource block) and/or others. Similar to the first embodiment, the radio communication state information may include reception quality information on the neighboring radio stations and/or communication traffic information, for example.

The waveform information extraction unit 202 calculates waveform features of incoming signals based on the acquired feature information on signals used by the neighboring radio stations.

The radio resource parameter determination unit 203 determines whether data transmissions are to be enabled and specifies radio resource parameters based on the radio communication state information supplied from the information acquisition unit 201 and the waveform features supplied from the waveform information extraction unit 202. Then, the determined availability of the data transmissions and the specified radio resource parameters are supplied to the parameter control unit 206 in FIG. 14. The radio resource parameters determined by the radio resource parameter determination unit 203 may include, but are not limited to, a center frequency, a bandwidth, transmit power, a modulation scheme and a coding scheme.

The signal demodulation unit 212 uses the information necessary for signal demodulation as derived by the information acquisition unit 201 to demodulate received signals incoming to the antenna 204. Then, the demodulated signal is supplied to the reliability determination unit 213, which calculates reliability level of the demodulation and supplies the calculated reliability level to the radio resource parameter determination unit 203. For example, the calculated reliability level may be derived from detection results of error detection codes, decoding error rates of known symbols included in the received signal and/or others. Although not essential, a higher reliability level means a higher SNR (Signal to Noise Ratio) under the assumption that signals received from other radio stations are defined as the signal component S in the SNR. Thus, if such a higher reliability level has been measured for the signals received from other radio stations, unlimited signal transmission from the radio station 21 may cause interference to the other radio stations. In this case, some measurements for avoiding the interference are taken, and then the signal transmission would be enabled.

In the radio resource parameter determination unit 203, if the reliability level determined by the reliability determination unit 213 is higher than a threshold, the interference estimation unit 214 estimates interference that may influence neighboring radio stations. The influencing interference can be estimated based on the radio communication state information supplied from the information acquisition unit 201 and information included in the demodulation result supplied from the signal demodulation unit 212. In order to decrease the interference influencing the neighboring radio stations, the radio resource parameter determination unit 203 specifies the radio resource parameters such as an antenna weight, transmit power, a center frequency, a bandwidth, a modulation scheme and a coding scheme.

If it is determined that the reliability level is higher than the threshold and that the demodulation has been successful, the radio resource parameter determination unit 203 specifies the radio resource parameters and determines availability of data transmission based on the estimated interference. On the other hand, if it is determined that the reliability level is lower than the threshold and that the demodulation has not been successful, the radio resource parameter determination unit 203 discards the demodulation result and determines the radio resource parameters and the availability of data transmissions based on the waveform features supplied from the waveform information extraction unit 202.

[Operation]

Figure 16:
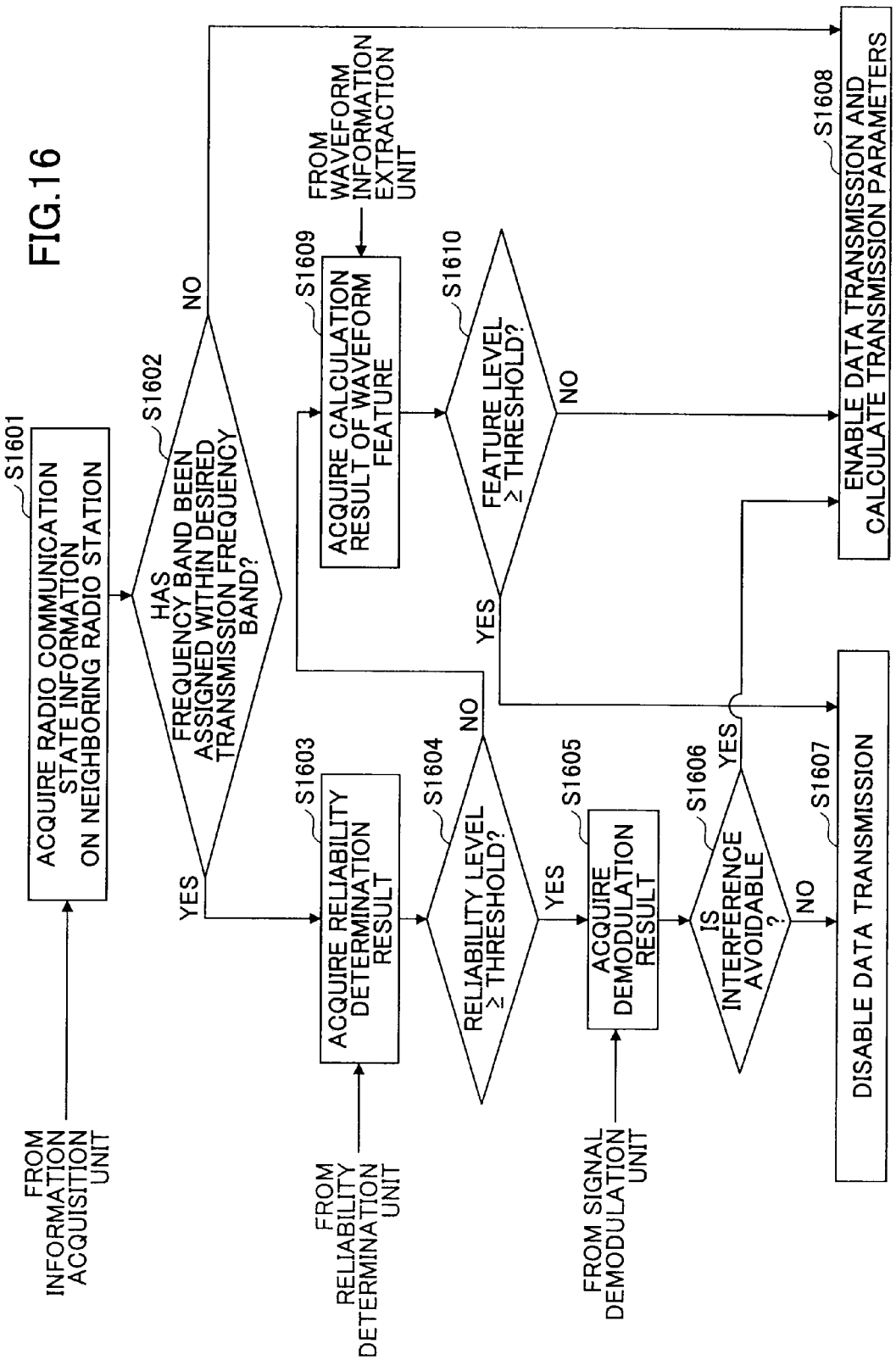
FIG. 16 is a flowchart of an exemplary control procedure of a radio resource parameter determination unit in a controller according to the second embodiment.

FIG. 16 is a flowchart of a control procedure in the radio resource parameter determination unit 203 in the controller 20. At step S1601, the information acquisition unit 201 in FIG. 15 acquires radio communication state information on neighboring radio stations. Based on frequency band usage state information in the radio communication state information, the radio resource parameter determination unit 203 determines whether a transmission band desired by the radio station 21 includes a band assigned to the neighboring radio stations at step S1602. If the desired transmission band does not include the assigned band, at step S1608, the radio resource parameter determination unit 203 enables data transmissions.

As illustrated in FIG. 15, received signals are supplied and demodulated in the signal demodulation unit 212. The information acquisition unit 201 provides the signal demodulation unit 212 with information indicating how to demodulate the signals such as a data modulation scheme, a channel coding rate and a frequency band. Then, the reliability determination unit 213 determines the reliability of the demodulation result.

If it is determined at step S1602 that the desired transmission band includes a band assigned to the neighboring radio stations, at step S1604, the determined reliability, that is, the calculated reliability level, is compared with a threshold.

If the reliability level exceeds the threshold, unlimited signal transmission from the radio station 21 may cause interference influencing other radio stations. In this case, some measurements for avoiding the interference are taken, and then the signal transmissions are enabled. If the measurements cannot be taken, the signal transmissions are disabled. In the illustrated embodiment, the radio resource parameter determination unit 203 acquires information regarding demodulation results from the signal demodulation unit 212 at step S1605 and determines whether the interference is avoidable at step S1606. If it is determined that the interference is not avoidable, the radio resource parameter determination unit 203 disables the data transmission at step S1607. On the other hand, if it is determined that the interference is avoidable, the radio resource parameter determination unit 203 enables the data transmission at step S1608.

If the reliability level does not exceed the threshold at step S1604, signals received from other radio stations may arrive at the radio station 21 properly. In this case, signals received and demodulated in the radio station 21 are not suitable as criteria for determining whether the radio station 21 transmits signals, and thus the demodulation result is discarded. Then, the radio resource parameter determination unit 203 determines availability of signal transmission from the radio station 21 based on waveform features as in the first embodiment. If it is determined at step S1604 that the reliability level does not exceed the threshold, at step S1609, the radio resource parameter determination unit 203 acquires waveform features or feature levels calculated for received signals at the waveform information extraction unit 202. At step S1610, the acquired feature level is compared with a threshold. If the feature level exceeds the threshold, at step S1607, the radio resource parameter determination unit 203 disables data transmissions. On the other hand, if the feature level does not exceed the threshold, at step S1608, the radio resource parameter determination unit 203 enables the data transmission and specifies transmission parameters.

In the above-stated embodiment, the reliability determination results, the demodulation results and the waveform feature calculation results are fetched from some different components as illustrated in the flowchart in FIG. 16. In other embodiments, all the results may be stored in a memory separately provided in the controller 20 before initiation of the flow in FIG. 16, and the results may be fetched from the memory as needed.

According to the second embodiment, there is a likelihood that transmissions may be enabled even in the cases where not only the feature level is high (step S1610: NO) but also the reliability level of the demodulated signal is high (step S1604: YES). In other words, the waveform feature information can be acquired even under lower reception SNR environments as in the first embodiment, and a larger amount of information can be also acquired based on the demodulation results even under higher reception SNR environments. The fact that a certain radio station (e.g., radio station 1101) receives a signal with a higher SNR may correspond to occurrence of extremely significant interference influencing a radio station transmitting the signal (e.g., radio station 1102). However, information derived from the demodulation results can be utilized to reduce the interference influencing the transmitting radio station sufficiently with use of transmission beam control or precise transmit power control, for example. In this case, communication opportunities can be gained, and higher frequency utilization efficiency can be achieved.

Also in this embodiment, the interference estimation unit 214 may not be provided. Even in this case, more detailed information can be derived from the demodulation results than the waveform feature information. Accordingly, more accurate information pieces can be gained in information collections performed periodically or within a certain time period before the above-stated control operations, and thus more reliable radio resource control can be fulfilled than the first embodiment.

[Variation 2.1]

Figure 17:
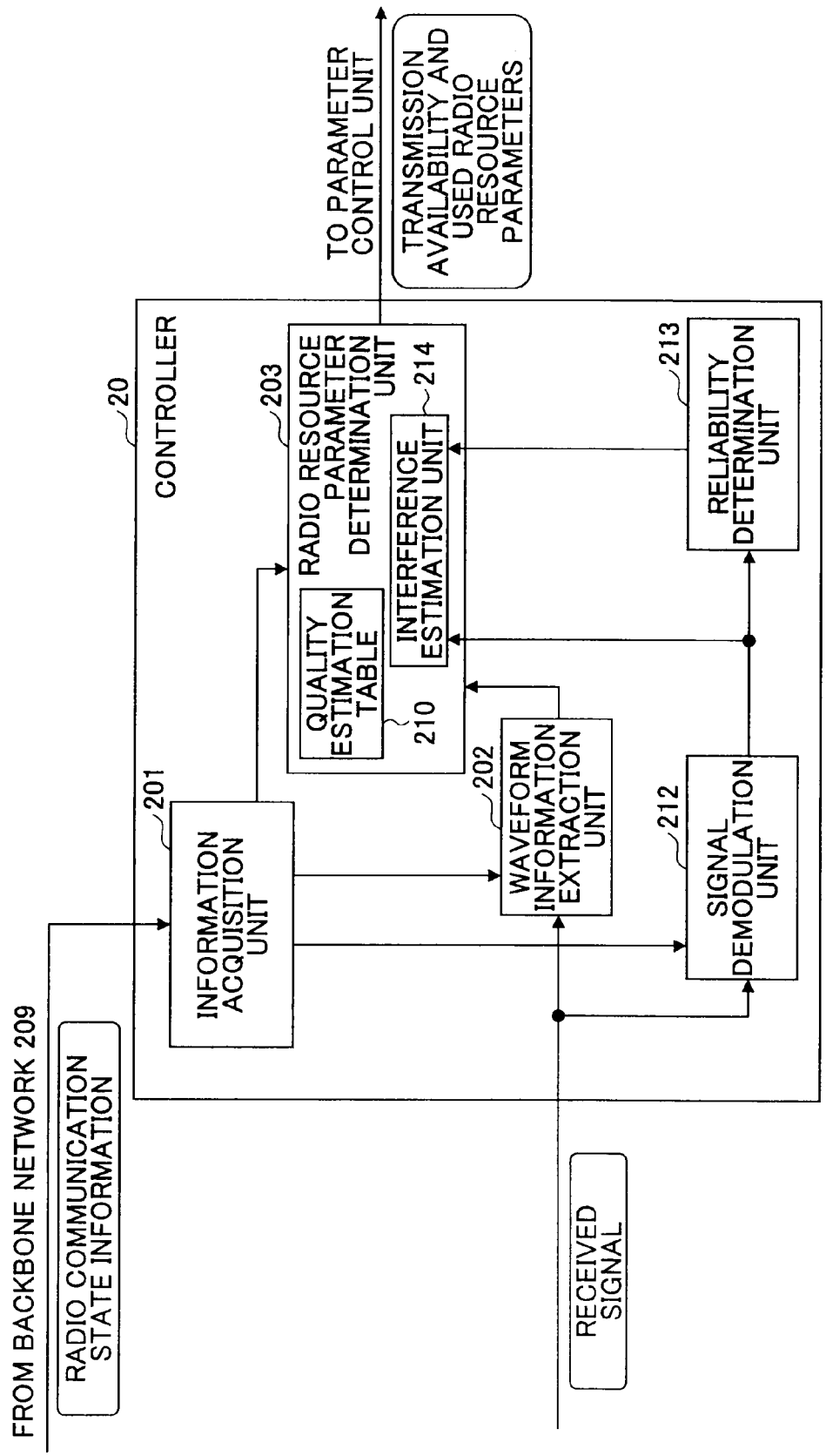
FIG. 17 is a block diagram illustrating a controller in a radio station according to a first variation 2.1 of the second embodiment.

FIG. 17 illustrates the controller 20 according to a first variation 2.1 of the second embodiment. Similar to the variation 1.1 of the first embodiment, the radio resource parameter determination unit 203 includes a quality estimation table 210.

The quality estimation table 210 includes correspondence between waveform feature values derived by the waveform information extraction unit 202 and channel qualities between the radio station 21 and neighboring radio stations. Upon receiving waveform features calculated at the waveform information extraction unit 202, the radio resource parameter determination unit 203 estimates the channel quality between the radio station 21 and a neighboring radio station with reference to the quality estimation table 210.

Figure 18:
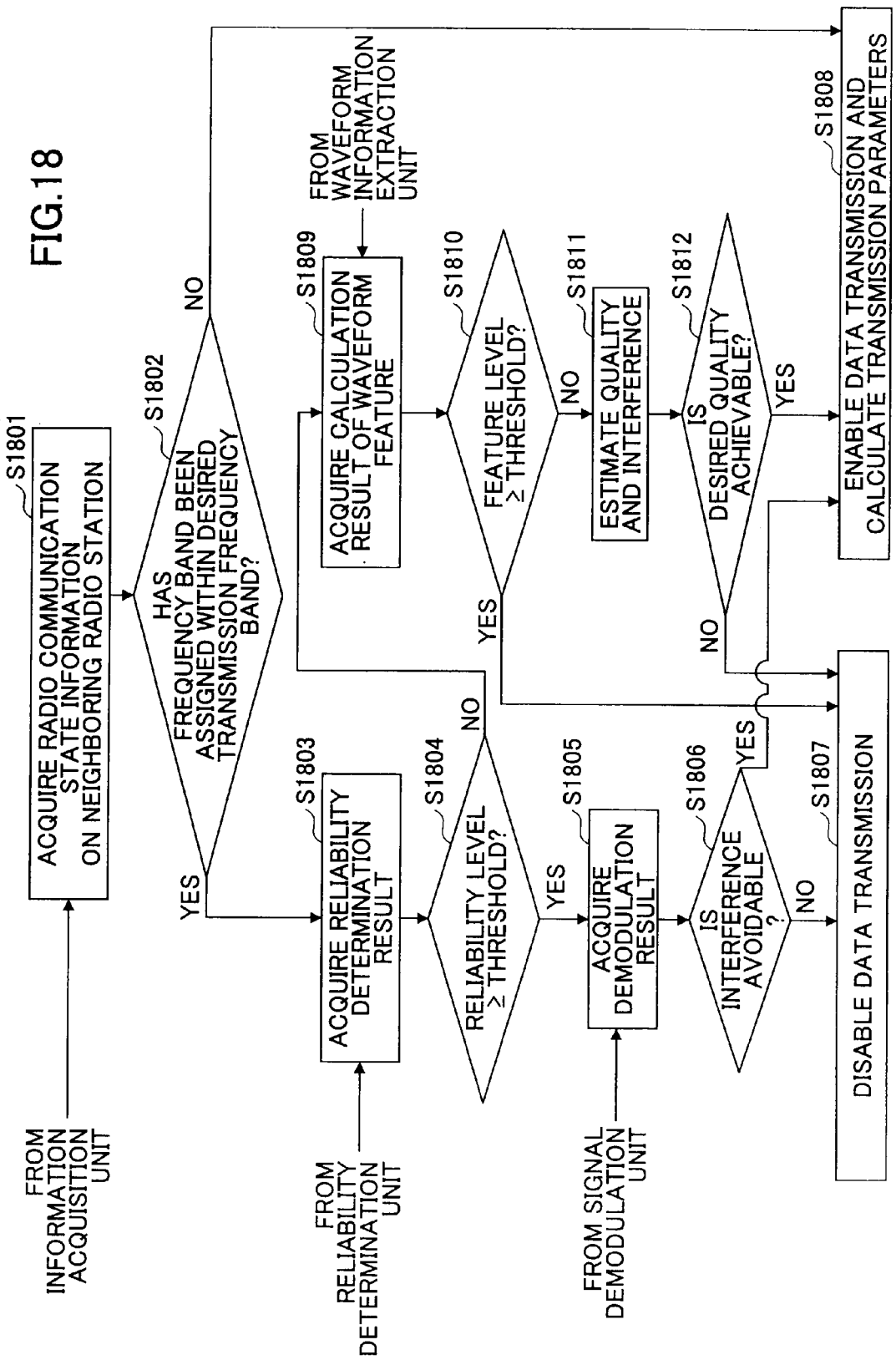
FIG. 18 is a flowchart of an exemplary control procedure of a radio resource parameter determination unit in a controller according to the first variation 2.1.

FIG. 18 is a flowchart of an exemplary control procedure at the controller 20 according to this variation. At step S1801, the information acquisition unit 201 in FIG. 17 acquires radio communication state information on neighboring radio stations. Based on frequency band usage state information in the radio communication state information, the radio resource parameter determination unit 203 determines whether a transmission band desired by the radio station 21 includes a band assigned to the neighboring radio stations at step S1802. If the desired transmission band does not include the assigned band, at step S1808, the radio resource parameter determination unit 203 enables data transmission. On the other hand, if the desired transmission band includes the assigned band, the radio resource parameter determination unit 203 acquires reliability determination (reliability level) at step S1803 and compares the reliability level with a threshold at step S1804. If the reliability level exceeds the threshold, the radio resource parameter determination unit 203 acquires demodulation result information from the signal demodulation unit 212 at step S1805 and uses the interference estimation unit 214 to determine whether interference is avoidable at step S1806. If it is determined that the interference is not avoidable, the radio resource parameter determination unit 203 disables data transmissions at step S1807. On the other hand, if it is determined that the interference is avoidable, the radio resource parameter determination unit 203 enables the data transmission and specifies transmission parameters at step S1808.

If the reliability level of the demodulation result does not exceed the threshold at step S1804, the demodulation result is ignored, and waveform features calculated for received signals are used as in the first embodiment at step S1809. At step S1810, the radio resource parameter determination unit 203 compares the acquired waveform feature level with a threshold. If the feature level does not exceed the threshold, the radio resource parameter determination unit 203 uses the quality estimation table 210 to estimate the channel quality between the radio station 21 and a neighboring radio station based on the feature level to estimate a interference level that may influence the neighboring radio stations at step S1811. Then, at step S1812, the radio resource parameter determination unit 203 determines whether a desired communication quality, such as a desired data rate, can be achieved under a transmit power constraint where the interference can be limited below a predefined level. If it is determined that the desired communication quality cannot be achieved, at step S1807, the radio resource parameter determination unit 203 disables data transmissions. On the other hand, if it is determined that the desired communication quality can be achieved, at step S1808, the radio resource parameter determination unit 203 enables the data transmission and specifies the transmission parameters for the constraint. In the above-stated embodiment, the reliability determination results, the demodulation results and the waveform feature calculation results are fetched from some different components as illustrated in the flowchart in FIG. 18. In other embodiments, all the results may be stored in a memory separately provided in the controller 20 before initiation of the flow in FIG. 18, and the results may be fetched from the memory as needed.

According to the variation 2.1, similar to the variation 1.1, if the reliability level of the demodulation result is lower than or equal to the threshold and the feature level is higher than or equal to the threshold, the parameters such as transmit power can be flexibly controlled depending on the channel characteristics between the radio station 21 and the neighboring radio stations to enable signal transmission at interference power within which interference cannot influence the neighboring radio stations. As a result, it is possible to increase communication opportunities and improve frequency utilization efficiency.

[Variation 2.2]

Figure 19:
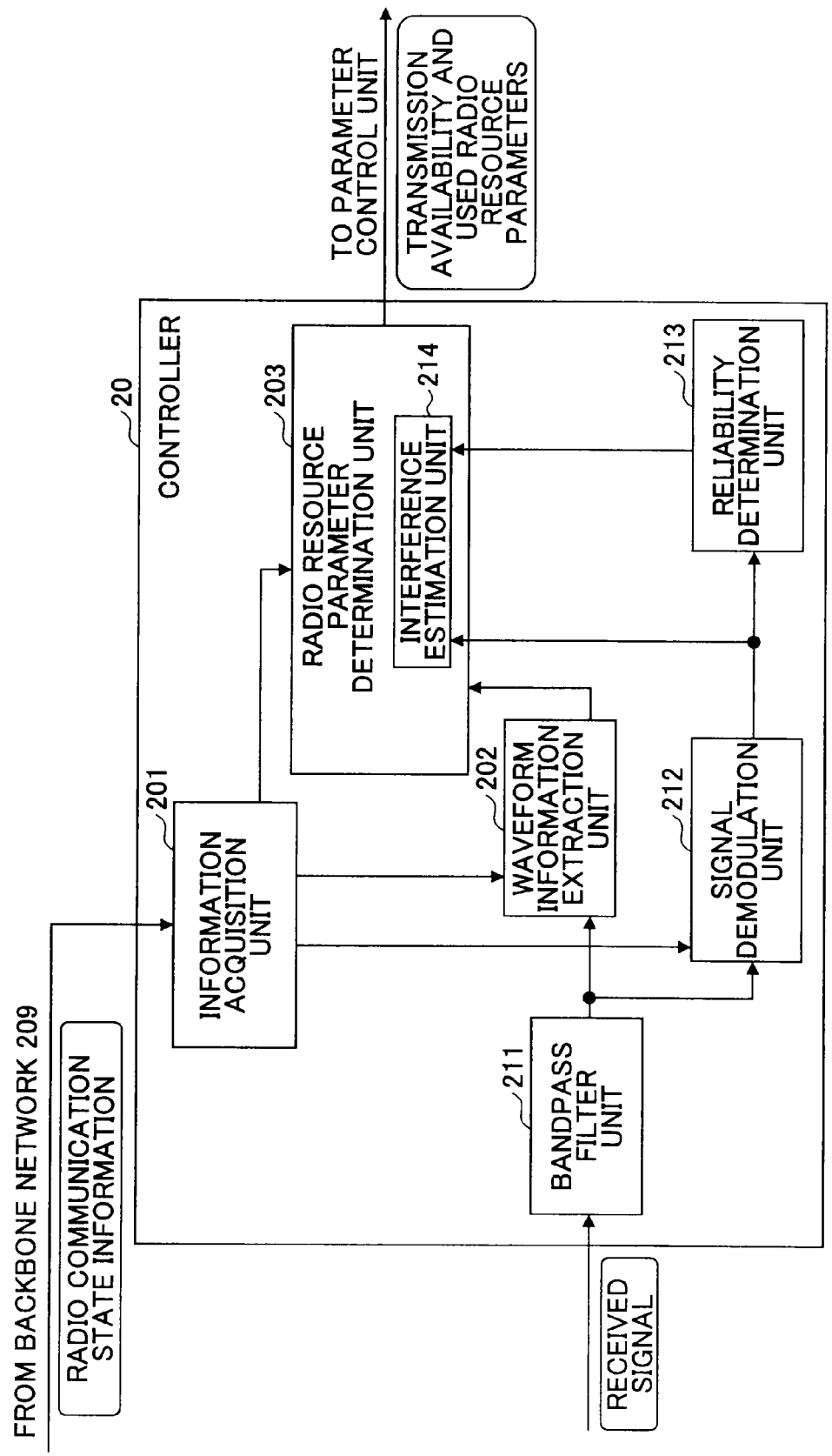
FIG. 19 is a block diagram illustrating a controller in a radio station according to a second variation 2.2 of the second embodiment.

FIG. 19 is a block diagram illustrating the controller 20 according to a second variation 2.2 of the second embodiment. In this variation, similar to the variation 1.2 as illustrated in FIG. 7, signals incoming to the antenna 204 in the radio station 21 are supplied to the bandpass filter unit 211 in the controller 20 via the transmission and reception splitter unit 205 for band-limiting. The bandpass filter unit 211 may be dedicated to the controller 20 or shared with a noise removal filter for use in normal radio communications. The bandpass filter unit 211 is configured to have a pass band corresponding to frequency bands used by neighboring radio stations based on the frequency usage state information supplied from the information acquisition unit 201, as illustrated in the exemplary pass band setup in FIG. 8, for example. A band-limited signal is supplied to the waveform information extraction unit 202 and the signal demodulation unit 212 for waveform feature calculation and demodulation. In this manner, since some influences due to an unnecessary wave and a noise component existing out-of-band of the calculated signal can be removed, which can make the waveform feature calculation and the demodulation more accurate. In addition, the same calculation is performed on all signals existing around the radio station 21, resulting a larger amount of information and more accurate resource control.

As illustrated in the exemplary pass band setup in FIG. 9, the bandpass filter unit 211 may set a pass band corresponding to frequency bands for neighboring radio stations using a portion or all of a transmission band desired by the radio station 21 based on the frequency usage state information supplied from the information acquisition unit 201. In the illustrated example, signals B and C from neighboring radio stations are included in the desired transmission frequency. Accordingly, the bandpass filter unit 211 is configured to pass signals B and C and filter out the other signals such as signal A from another neighboring radio station. According to such a band-limiting scheme, the waveform feature calculation and the demodulation can be performed on only signals transmitted from neighboring radio stations that may possibly have some influences on the desired transmission band, resulting in a lesser amount of the calculation than the band-limiting scheme in FIG. 8. Also, signals out-of-band of the desired transmission band are ignored, and thus signals in bands having characteristics significantly different from the desired transmission band do not have to be taken into account. As a result, the feature calculation, the demodulation and the resource control suitable for the frequency band actually used to transmit signals can be achieved.

As illustrated in the exemplary pass band setup in FIG. 10, the bandpass filter unit 211 may set a pass band corresponding to the transmission band desired by the radio station 21. According to such a band-limiting scheme, the waveform feature calculation and the demodulation can be performed on only signals existing within the desired transmission band. As a result, even if signals on which the radio station 21 has no information beforehand may be present in the band or if signals are shifted toward a band different from bands obtained from frequency usage state information due to frequency offset influence, the waveform feature calculation and the demodulation can be performed. In these cases, if the bandpass filter unit 211 has the same characteristics as a filter used for transmission and reception in the radio station 21, the bandpass filter unit 211 in the controller 20 can be also used for the normal transmission and reception. On the other hand, the filter for the transmission and reception can be also used as the bandpass filter unit 211 in the controller 20.

The above-stated variations 1.1, 1.2, 2.1 and 2.2 can be combined. For example, in a combination of the variations 1.1 and 1.2 of the first embodiment, the radio resource parameter determination unit 103 may include the quality estimation table 110, and the controller 10 may include the bandpass filter unit 111. According to this arrangement, the controller 10 of the first embodiment can calculate the waveform feature more accurately, and thus even if the feature level falls below a threshold, some parameters such as transmit power can be flexibly controlled depending on channel characteristics between the radio station 11 and neighboring radio stations.

[Variation 2.3]

Similarly, the variations 2.1 and 2.2 of the second embodiment can be combined. In a third variation 2.3 of the second embodiment, the controller 20 being a combination of the variations 2.1 and 2.2 is described below.

Figure 20:
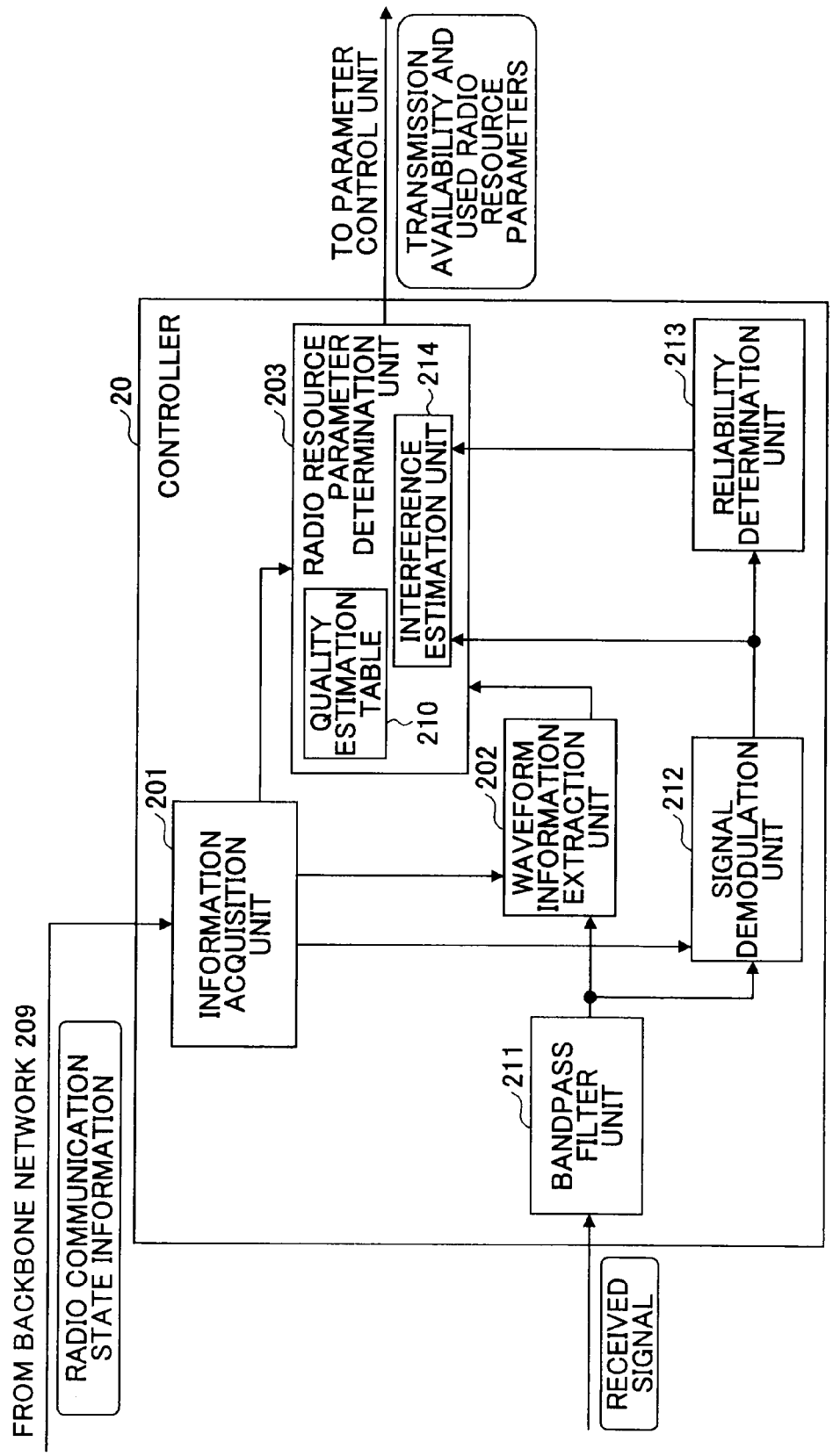
FIG. 20 is a block diagram illustrating a controller in a radio station according to the second variation 2.3.

FIG. 20 is a block diagram illustrating the controller 20 according to the third variation 2.3 of the second embodiment. The controller 20 further includes a quality estimation table 210 and a bandpass filter unit 211.

In the variation 2.3, similar to the first variation 2.1, radio parameters can be flexibly controlled depending on channel characteristics between the radio station 21 and neighboring radio stations if the reliability of demodulation results is lower than or equal to a threshold and the feature level is higher than or equal to a threshold. According to the third variation, the radio station 21 can transmit signals while making some consideration so that interference cannot influence the neighboring radio stations. As a result, it is possible to increase communication opportunities and improve frequency utilization efficiency. Also, similar to the second variation 2.2, the bandpass filter unit 211 can filter out an unnecessary wave and a noise component out-of-band of calculated signals, and thus the waveform feature calculation and the demodulation can be performed accurately.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience, apparatuses according to the embodiments of the present invention have been described with reference to functional block diagrams, but these apparatuses may be implemented in hardware, software or combinations thereof. The software may be embodied in a RAM (Random Access Memory), a flash memory, a ROM (Read Only Memory), a EPROM (Erasable Programmable ROM), a EEPROM (Electrically EPROM), a register, a hard disk drive (HDD), a removable disk, CD-ROM (Compact Disk-ROM) and any other appropriate storage medium. The present invention is not limited to the above embodiments, and variations, modifications, alterations and substitutions can be made by those skilled in the art without deviating from the spirit of the present invention.

The present application is based on Japanese Priority Application No. 2009-060237 filed on Mar. 12, 2009, the entire contents of which are hereby incorporated by reference.

What is claimed is:

1. A controller for controlling transmission availability for a radio station in a radio communication system, comprising:
an information acquisition unit configured to acquire radio communication state information on another radio station different from the radio station via a backbone network connected to the radio station and the other radio station, the radio communication state information including frequency information indicative of a frequency band used by the other radio station and waveform feature information indicative of a waveform feature of a radio signal transmitted from the other radio station, the waveform feature including cyclostationarity derived from second order periodic autocorrelations, variances of signal amplitudes or frequency correlations;
a waveform information extraction unit configured to receive a radio signal and calculate a waveform feature based on the waveform feature information, the waveform feature indicating whether the received radio signal includes the radio signal transmitted from the other radio station; and
a radio resource parameter determination unit configured to determine whether signal transmission from the radio station is available by comparing a waveform feature threshold with the waveform feature calculated by the waveform information extraction unit and specify a radio resource to be used for the signal transmission based on the frequency information, the waveform feature information and/or the calculated waveform feature.

2. The controller as claimed in claim 1, further comprising:
a signal demodulation unit configured to receive and demodulate a radio signal to generate a demodulated data symbol sequence; and
a reliability determination unit configured to determine reliability of the demodulated data symbol sequence,
wherein the radio resource parameter determination unit is configured to determine whether signal transmission from the radio station is available and specify a radio resource to be used for the signal transmission based on the frequency information, the waveform feature information, the calculated waveform feature, the demodulated data symbol sequence and/or the reliability.

3. The controller as claimed in claim 2, wherein the radio resource parameter determination unit is configured to, if the reliability of the demodulated data symbol sequence is lower than or equal to a threshold, discard the demodulated data symbol sequence, determine whether signal transmission from the radio station is available and specify a radio resource to be used for the signal transmission based on the frequency information, the waveform feature information and/or the calculated waveform feature.

4. The controller as claimed in claim 2, wherein
the radio resource parameter determination unit comprises an interference estimation unit configured to estimate an interference level influencing the other radio station based on the demodulated data symbol sequence, and
the radio resource parameter determination unit is configured to, if the reliability of the demodulated data symbol sequence is higher than or equal to a threshold, determine whether signal transmission from the radio station is available and specify a radio resource to be used for the signal transmission based on the estimated interference level.

5. The controller as claimed in claim 1, wherein the radio resource parameter determination unit is configured to disable the signal transmission if the radio resource parameter determination unit determines that the other radio station uses a desired transmission frequency band based on the frequency information and the calculated waveform feature exceeds the waveform feature threshold.

6. The controller as claimed in claim 1, wherein
the radio resource parameter determination unit comprises a quality estimation table including correspondence between a peak amount of a waveform feature and signal quality of a channel between the radio station and the other radio station, and
the radio resource parameter determination unit is configured to estimate the signal quality of the channel based on the calculated waveform feature to determine whether signal transmission from the radio station is available and specify a radio resource to be used for the signal transmission.

7. The controller as claimed in claim 1, further comprising:
a bandpass filter unit configured to pass a band component of a received radio signal and filter out another band component, the band pass filter unit being further configured to perform band-limiting on the received radio signal based on the frequency information.

8. The controller as claimed in claim 7, wherein the bandpass filter unit is configured to perform the band-limiting in accordance with the pass band corresponding to a frequency band including a transmission frequency band desired by the radio station based on the frequency information.

9. The controller as claimed in claim 8, wherein the bandpass filter unit is configured to perform the band-limiting in accordance with the pass band corresponding to the transmission frequency band desired by the radio station.

10. A method of controlling transmission availability for a radio station in a radio communication system, comprising:
acquiring radio communication state information on another radio station different from the radio station via a backbone network connected to the radio station and the other radio station, the radio communication state information including frequency information indicative of a frequency band used by the other radio station and waveform feature information indicative of a waveform feature of a radio signal transmitted from the other radio station, the waveform feature including cyclostationarity derived from second order periodic autocorrelations, variances of signal amplitudes or frequency correlations;
receiving a radio signal and calculating a waveform feature based on the waveform feature information, the waveform feature indicating whether the received radio signal includes the radio signal transmitted from the other radio station; and
determining whether signal transmission from the radio station is available by comparing a waveform feature threshold with the calculated waveform feature and specifying a radio resource to be used for the signal transmission based on the frequency information, the waveform feature information and/or the calculated waveform feature.

11. The method as claimed in claim 10, further comprising:
receiving and demodulating a radio signal to generate a demodulated data symbol sequence; and
determining reliability of the demodulated data symbol sequence,
wherein the step of determining whether signal transmission from the radio station is available and specifying a radio resource to be used for the signal transmission comprises determining whether signal transmission from the radio station is available and specifying a radio resource to be used for the signal transmission based on the frequency information, the waveform feature information, the calculated waveform feature, the demodulated data symbol sequence and/or the reliability.

12. The method as claimed in claim 11, wherein the step of determining whether signal transmission from the radio station is available and specifying a radio resource to be used for the signal transmission comprises, if the reliability of the demodulated data symbol sequence is lower than or equal to a threshold, discarding the demodulated data symbol sequence, determining whether signal transmission from the radio station is available and specifying a radio resource to be used for the signal transmission based on the frequency information, the waveform feature information and/or the calculated waveform feature.

13. The method as claimed in claim 11, wherein the step of determining whether signal transmission from the radio station is available and specifying a radio resource to be used for the signal transmission comprises estimating an interference level influencing the other radio station based on the demodulated data symbol sequence, and
the step of determining whether signal transmission from the radio station is available and specifying a radio resource to be used for the signal transmission comprises, if the reliability of the demodulated data symbol sequence is higher than or equal to a threshold, determining whether signal transmission from the radio station is available and specifying a radio resource to be used for the signal transmission based on the estimated interference level.

14. The method as claimed in claim 10, wherein the step of determining whether signal transmission from the radio station is available and specifying a radio resource to be used for the signal transmission comprises disabling the signal transmission if it is determined that the other radio station uses a desired transmission frequency band based on the frequency information and the calculated waveform feature exceeds the waveform feature threshold.

15. The method as claimed in claim 10, wherein the step of determining whether signal transmission from the radio station is available and specifying a radio resource to be used for the signal transmission comprises using a quality estimation table including correspondence between a peak amount of a waveform feature and signal quality of a channel between the radio station and the other radio station to estimate the signal quality of the channel based on the calculated waveform feature to determine whether signal transmission from the radio station is available and specify a radio resource to be used for the signal transmission.

16. The method as claimed in claim 10, further comprising:
passing a band component of a received radio signal and filtering out another band component, the step of passing further comprising performing band-limiting on the received radio signal based on the frequency information.

17. The method as claimed in claim 16, wherein the step of performing band-limiting comprises performing the band-limiting in accordance with the pass band corresponding to a frequency band including a transmission frequency band desired by the radio station based on the frequency information.

18. The method as claimed in claim 17, wherein the step of performing band-limiting comprises performing the band-limiting in accordance with the pass band corresponding to the transmission frequency band desired by the radio station.

* * * * *